(12) United States Patent
Leonard et al.

(10) Patent No.: US 9,418,339 B1
(45) Date of Patent: Aug. 16, 2016

(54) SYSTEMS AND METHODS FOR TIME SERIES ANALYSIS TECHNIQUES UTILIZING COUNT DATA SETS

(71) Applicant: SAS Institute Inc., Cary, NC (US)

(72) Inventors: Michael James Leonard, Cary, NC (US); David Bruce Elsheimer, Cary, NC (US)

(73) Assignee: SAS Institute, Inc., Cary, NC (US)

( * ) Notice: Subject to any disclaimer, the term of this patent is extended or adjusted under 35 U.S.C. 154(b) by 0 days.

(21) Appl. No.: 14/948,970

(22) Filed: Nov. 23, 2015

Related U.S. Application Data

(60) Provisional application No. 62/107,761, filed on Jan. 26, 2015, provisional application No. 62/116,507, filed on Feb. 15, 2015, provisional application No. 62/128,965, filed on Mar. 5, 2015, provisional application No. 62/128,996, filed on Mar. 5, 2015, provisional application No. 62/130,771, filed on Mar. 10, 2015, provisional application No. 62/146,532, filed on Apr. 13, 2015.

(51) Int. Cl.
| | |
|---|---|
| *G06F 17/00* | (2006.01) |
| *G06N 5/02* | (2006.01) |
| *G06F 15/18* | (2006.01) |
| *G06N 7/00* | (2006.01) |

(52) U.S. Cl.
CPC . *G06N 7/005* (2013.01); *G06N 5/02* (2013.01)

(58) Field of Classification Search
None
See application file for complete search history.

(56) References Cited

U.S. PATENT DOCUMENTS

| | | | |
|---|---|---|---|
| 5,461,699 | A | 10/1995 | Arbabi et al. |
| 5,615,109 | A | 3/1997 | Eder |
| 5,870,746 | A | 2/1999 | Knutson et al. |
| 5,918,232 | A | 6/1999 | Pouschine et al. |

(Continued)

FOREIGN PATENT DOCUMENTS

| | | |
|---|---|---|
| EP | 2624171 A2 | 8/2013 |
| WO | 0217125 A1 | 2/2002 |
| WO | 2005/124718 A2 | 12/2005 |

OTHER PUBLICATIONS

Aiolfi, Marco et al., "Forecast Combinations," CREATES Research Paper 2010-21, School of Economics and Management, Aarhus University, 35 pp. (May 6, 2010).

(Continued)

*Primary Examiner* — Kakali Chaki
*Assistant Examiner* — Daniel Pellett
(74) *Attorney, Agent, or Firm* — Kilpatrick Townsend & Stockton, LLP

(57) ABSTRACT

Systems and methods are included for adjusting a set of predicted future data points for a time series data set including a receiver for receiving a time series data set. One or more processors and one or more non-transitory computer readable storage mediums containing instructions may be utilized. A count series forecasting engine, utilizing the one or more processors, generates a set of counts corresponding to discrete values of the time series data set. An optimal discrete probability distribution for the set of counts is selected. A set of parameters are generated for the optimal discrete probability distribution. A statistical model is selected to generate a set of predicted future data points. The set of predicted future data points are adjusted using the generated set of parameters for the optimal discrete probability distribution in order to provide greater accuracy with respect to predictions of future data points.

42 Claims, 27 Drawing Sheets

(56) References Cited

U.S. PATENT DOCUMENTS

| | | |
|---|---|---|
| 5,953,707 A | 9/1999 | Huang et al. |
| 5,991,740 A | 11/1999 | Messer |
| 5,995,943 A | 11/1999 | Bull et al. |
| 6,052,481 A | 4/2000 | Grajski et al. |
| 6,128,624 A | 10/2000 | Papierniak et al. |
| 6,151,584 A | 11/2000 | Papierniak et al. |
| 6,169,534 B1 | 1/2001 | Raffel et al. |
| 6,189,029 B1 | 2/2001 | Fuerst |
| 6,208,975 B1 | 3/2001 | Bull et al. |
| 6,216,129 B1 | 4/2001 | Eldering |
| 6,223,173 B1 | 4/2001 | Wakio et al. |
| 6,230,064 B1 | 5/2001 | Nakase et al. |
| 6,286,005 B1 | 9/2001 | Cannon |
| 6,308,162 B1 | 10/2001 | Ouimet et al. |
| 6,317,731 B1 | 11/2001 | Luciano |
| 6,334,110 B1 | 12/2001 | Walter et al. |
| 6,356,842 B1 | 3/2002 | Intriligator et al. |
| 6,397,166 B1 | 5/2002 | Leung et al. |
| 6,400,853 B1 | 6/2002 | Shiiyama |
| 6,526,405 B1 | 2/2003 | Mannila et al. |
| 6,539,392 B1 | 3/2003 | Rebane |
| 6,542,869 B1 | 4/2003 | Foote |
| 6,564,190 B1 | 5/2003 | Dubner |
| 6,591,255 B1 | 7/2003 | Tatum et al. |
| 6,609,085 B1 | 8/2003 | Uemura et al. |
| 6,611,726 B1 | 8/2003 | Crosswhite |
| 6,640,227 B1 | 10/2003 | Andreev |
| 6,735,738 B1 | 5/2004 | Kojima |
| 6,748,374 B1 | 6/2004 | Madan et al. |
| 6,775,646 B1 | 8/2004 | Tufillaro et al. |
| 6,792,399 B1 | 9/2004 | Phillips et al. |
| 6,850,871 B1 | 2/2005 | Barford et al. |
| 6,876,988 B2 | 4/2005 | Helsper et al. |
| 6,878,891 B1 | 4/2005 | Josten et al. |
| 6,928,398 B1 | 8/2005 | Fang et al. |
| 6,978,249 B1 | 12/2005 | Beyer et al. |
| 7,072,863 B1 | 7/2006 | Phillips et al. |
| 7,080,026 B2 | 7/2006 | Singh et al. |
| 7,103,222 B2 | 9/2006 | Peker |
| 7,130,822 B1 | 10/2006 | Their et al. |
| 7,130,833 B2 | 10/2006 | Kashima et al. |
| 7,152,068 B2 | 12/2006 | Emery et al. |
| 7,171,340 B2 | 1/2007 | Brocklebank |
| 7,194,434 B2 | 3/2007 | Piccioli |
| 7,216,088 B1 | 5/2007 | Chappel et al. |
| 7,222,082 B1 | 5/2007 | Adhikari et al. |
| 7,236,940 B2 | 6/2007 | Chappel |
| 7,240,019 B2 | 7/2007 | Delurgio et al. |
| 7,251,589 B1 | 7/2007 | Crowe et al. |
| 7,260,550 B1 | 8/2007 | Notani |
| 7,280,986 B2 | 10/2007 | Goldberg et al. |
| 7,433,809 B1 | 10/2008 | Guirguis |
| 7,433,834 B2 | 10/2008 | Joao |
| 7,454,420 B2 | 11/2008 | Ray et al. |
| 7,523,048 B1 | 4/2009 | Dvorak |
| 7,530,025 B2 | 5/2009 | Ramarajan et al. |
| 7,565,417 B2 | 7/2009 | Rowady, Jr. |
| 7,570,262 B2 | 8/2009 | Landau et al. |
| 7,610,214 B1 | 10/2009 | Dwarakanath et al. |
| 7,617,167 B2 | 11/2009 | Griffis et al. |
| 7,624,114 B2 | 11/2009 | Paulus et al. |
| 7,660,734 B1 | 2/2010 | Neal et al. |
| 7,660,823 B2 | 2/2010 | Clover |
| 7,664,618 B2 | 2/2010 | Cheung et al. |
| 7,689,456 B2 | 3/2010 | Schroeder et al. |
| 7,693,737 B2 | 4/2010 | Their et al. |
| 7,702,482 B2 | 4/2010 | Graepel et al. |
| 7,711,734 B2 | 5/2010 | Leonard |
| 7,716,022 B1 | 5/2010 | Park et al. |
| 7,774,179 B2 | 8/2010 | Guirguis |
| 7,941,413 B2 | 5/2011 | Kashiyama et al. |
| 7,966,322 B2 | 6/2011 | Clover |
| 8,005,707 B1 | 8/2011 | Jackson et al. |
| 8,010,324 B1 | 8/2011 | Crowe et al. |
| 8,010,404 B1 | 8/2011 | Wu et al. |
| 8,014,983 B2 | 9/2011 | Crowe et al. |
| 8,015,133 B1 | 9/2011 | Wu et al. |
| 8,087,001 B2 | 12/2011 | Hoyek et al. |
| 8,112,302 B1 | 2/2012 | Trovero et al. |
| 8,321,479 B2 | 11/2012 | Bley |
| 8,326,677 B1 | 12/2012 | Fan et al. |
| 8,364,517 B2 | 1/2013 | Trovero et al. |
| 8,374,903 B2 | 2/2013 | Little |
| 8,489,622 B2 | 7/2013 | Joshi et al. |
| 8,515,835 B2 | 8/2013 | Wu et al. |
| 8,631,040 B2 | 1/2014 | Jackson et al. |
| 8,645,421 B2 | 2/2014 | Meric et al. |
| 8,676,629 B2 | 3/2014 | Chien et al. |
| 8,768,866 B2 | 7/2014 | Desai |
| 9,208,209 B1 | 12/2015 | Katz |
| 2002/0169657 A1 | 11/2002 | Singh et al. |
| 2002/0169658 A1 | 11/2002 | Adler |
| 2003/0101009 A1 | 5/2003 | Seem |
| 2003/0105660 A1 | 6/2003 | Walsh et al. |
| 2003/0110016 A1 | 6/2003 | Stefek et al. |
| 2003/0154144 A1 | 8/2003 | Pokorny et al. |
| 2003/0187719 A1 | 10/2003 | Brocklebank |
| 2003/0200134 A1 | 10/2003 | Leonard et al. |
| 2003/0212590 A1 | 11/2003 | Klingler |
| 2004/0030667 A1 | 2/2004 | Xu et al. |
| 2004/0041727 A1 | 3/2004 | Ishii et al. |
| 2004/0172225 A1 | 9/2004 | Hochberg et al. |
| 2004/0230470 A1 | 11/2004 | Svilar et al. |
| 2005/0055275 A1 | 3/2005 | Newman et al. |
| 2005/0102107 A1 | 5/2005 | Porikli |
| 2005/0114391 A1 | 5/2005 | Corcoran et al. |
| 2005/0159997 A1 | 7/2005 | John |
| 2005/0177351 A1 | 8/2005 | Goldberg et al. |
| 2005/0209732 A1 | 9/2005 | Audimoolam et al. |
| 2005/0249412 A1 | 11/2005 | Radhakrishnan et al. |
| 2005/0271156 A1 | 12/2005 | Nakano |
| 2006/0063156 A1 | 3/2006 | Willman et al. |
| 2006/0064181 A1 | 3/2006 | Kato |
| 2006/0085380 A1 | 4/2006 | Cote et al. |
| 2006/0112028 A1 | 5/2006 | Xiao et al. |
| 2006/0143081 A1 | 6/2006 | Argaiz |
| 2006/0164997 A1 | 7/2006 | Graepel et al. |
| 2006/0241923 A1 | 10/2006 | Xu et al. |
| 2006/0247900 A1 | 11/2006 | Brocklebank |
| 2007/0011175 A1 | 1/2007 | Langseth et al. |
| 2007/0055604 A1 | 3/2007 | Their et al. |
| 2007/0094168 A1 | 4/2007 | Ayala et al. |
| 2007/0106550 A1 | 5/2007 | Umblijs et al. |
| 2007/0118491 A1 | 5/2007 | Baum et al. |
| 2007/0162301 A1 | 7/2007 | Sussman et al. |
| 2007/0203783 A1 | 8/2007 | Beltramo |
| 2007/0208492 A1 | 9/2007 | Downs et al. |
| 2007/0208608 A1 | 9/2007 | Amerasinghe et al. |
| 2007/0291958 A1 | 12/2007 | Jehan |
| 2008/0040202 A1 | 2/2008 | Walser et al. |
| 2008/0208832 A1 | 8/2008 | Friedlander et al. |
| 2008/0288537 A1 | 11/2008 | Golovchinsky et al. |
| 2008/0294651 A1 | 11/2008 | Masuyama et al. |
| 2009/0018996 A1 | 1/2009 | Hunt et al. |
| 2009/0099988 A1 | 4/2009 | Stokes et al. |
| 2009/0172035 A1 | 7/2009 | Lessing et al. |
| 2009/0216611 A1 | 8/2009 | Leonard et al. |
| 2009/0319310 A1 | 12/2009 | Little |
| 2010/0030521 A1 | 2/2010 | Akhrarov et al. |
| 2010/0063974 A1 | 3/2010 | Papadimitriou et al. |
| 2010/0106561 A1 | 4/2010 | Peredriy et al. |
| 2010/0114899 A1 | 5/2010 | Guha et al. |
| 2010/0121868 A1 | 5/2010 | Biannic et al. |
| 2010/0257133 A1 | 10/2010 | Crowe et al. |
| 2011/0106723 A1 | 5/2011 | Chipley et al. |
| 2011/0119374 A1 | 5/2011 | Ruhl et al. |
| 2011/0145223 A1 | 6/2011 | Cormode et al. |
| 2011/0208701 A1 | 8/2011 | Jackson et al. |
| 2011/0307503 A1 | 12/2011 | Dlugosch |
| 2012/0053989 A1 | 3/2012 | Richard |
| 2012/0123994 A1 | 5/2012 | Lowry et al. |
| 2012/0310939 A1 | 12/2012 | Lee et al. |
| 2013/0024167 A1 | 1/2013 | Blair et al. |
| 2013/0024173 A1 | 1/2013 | Brzezicki et al. |

(56) References Cited

U.S. PATENT DOCUMENTS

| | | |
|---|---|---|
| 2013/0238399 A1 | 9/2013 | Chipley et al. |
| 2013/0268318 A1 | 10/2013 | Richard |
| 2014/0019088 A1 | 1/2014 | Leonard et al. |
| 2014/0019448 A1 | 1/2014 | Leonard et al. |
| 2014/0019909 A1 | 1/2014 | Leonard et al. |
| 2014/0257778 A1 | 9/2014 | Leonard et al. |
| 2015/0052173 A1 | 2/2015 | Leonard et al. |
| 2016/0005055 A1* | 1/2016 | Sarferaz ............ G06Q 10/04 705/7.31 |
| 2016/0042101 A1* | 2/2016 | Yoshida ............ G06F 17/5009 703/2 |

OTHER PUBLICATIONS

Automatic Forecasting Systems Inc., Autobox 5.0 for Windows User's Guide, 82 pp. (1999).
Choudhury, J. Paul et al., "Forecasting of Engineering Manpower Through Fuzzy Associative Memory Neural Network with ARIMA: A Comparative Study", Neurocomputing, vol. 47, Iss. 1-4, pp. 241-257 (Aug. 2002).
Costantini, Mauro et al., "Forecast Combination Based on Multiple Encompassing Tests in a Macroeconomic DSGE System," Reihe Okonomie/ Economics Series 251, 24 pp. (May 2010).
Data Mining Group, available at http://www.dmg.org, printed May 9, 2005, 3 pp.
Funnel Web, Web site Analysis. Report, Funnel Web Demonstration, Authenticated Users History, http://www.quest.com/funnel.sub.--web/analyzer/sample/UserHist.html (1 pg.), Mar. 2002.
Funnel Web, Web site Analysis Report, Funnel Web Demonstration, Clients History, http://www/quest.com/funnel.sub.--web/analyzer/sample.ClientHist- .html (2 pp.), Mar. 2002.
Garavaglia, Susan et al., "A Smart Guide to Dummy Variables: Four Applications and a Macro," accessed from: http://web.archive.org/web/20040728083413/http://www.ats.ucla.edu/stat/sa- s/library/nesug98/p046.pdf, (2004).
Guerard John B. Jr., Automatic Time Series Modeling, Intervention Analysis, and Effective Forecasting. (1989) Journal of Statistical Computation and Simulation, 1563-5163, vol. 34, Issue 1, pp. 43-49.
Guralnik, V. and Srivastava, J., Event Detection from Time Series Data (1999), Proceedings of the 5th ACM SIGKDD International Conference on Knowledge Discovery and Data Mining, pp. 33-42.
Harrison, H.C. et al., "An Intelligent Business Forecasting System", ACM Annual Computer Science Conference, pp. 229-236 (1993).
Harvey, Andrew, "Forecasting with Unobserved Components Time Series Models," Faculty of Economics, University of Cambridge, Prepared for Handbook of Economic Forecasting, pp. 1-89 (Jul. 2004).
Jacobsen, Erik et al., "Assigning Confidence to Conditional Branch Predictions", IEEE, Proceedings of the 29th Annual International Symposium on Microarchitecture, 12 pp. (Dec. 2-4, 1996).
Keogh, Eamonn J. et al., "Derivative Dynamic Time Warping", In First SIAM International Conference on Data Mining (SDM'2001), Chicago, USA, pp. 1-11 (2001).
Kobbacy, Khairy A.H., et al., Abstract, "Towards the development of an intelligent inventory management system," Integrated Manufacturing Systems, vol. 10, Issue 6, (1999) 11 pp.
Kumar, Mahesh, "Combining Forecasts Using Clustering", Rutcor Research Report 40/2005, cover page and pp. 1-16 (Dec. 2005).
Leonard, Michael et al., "Mining Transactional and Time Series Data", abstract and presentation, International Symposium of Forecasting, 23 pp. (2003).
Leonard, Michael et al., "Mining Transactional and Time Series Data", abstract, presentation and paper, SUGI, 142 pp. (Apr. 10-13, 2005).
Leonard, Michael, "Large-Scale Automatic Forecasting Using Inputs and Calendar Events", abstract and presentation, International Symposium on Forecasting Conference, 56 pp. (Jul. 4-7, 2004).
Leonard, Michael, "Large-Scale Automatic Forecasting Using Inputs and Calendar Events", White Paper, pp. 1-27 (2005).
Leonard, Michael, "Large-Scale Automatic Forecasting: Millions of Forecasts", abstract and presentation, International Symposium of Forecasting, 156 pp. (2002).
Leonard, Michael, "Predictive Modeling Markup Language for Time Series Models", abstract and presentation, International Symposium on Forecasting Conference, 35 pp. (Jul. 4-7, 2004).
Leonard, Michael, "Promotional Analysis and Forecasting for Demand Planning: A Practical Time Series Approach", with exhibits 1 and 2, SAS Institute Inc., Cary, North Carolina, 50 pp. (2000).
Lu, Sheng et al., "A New Algorithm for Linear and Nonlinear ARMA Model Parameter Estimation Using Affine Geometry", IEEE Transactions on Biomedical Engineering, vol. 48, No. 10, pp. 1116-1124 (Oct. 2001).
Malhotra, Manoj K. et al., "Decision making using multiple models", European Journal of Operational Research, 114, pp. 1-14 (1999).
McQuarrie, Allan D.R. et al., "Regression and Time Series Model Selection", World Scientific Publishing Co. Pte. Ltd., 40 pp. (1998).
Oates, Tim et al., "Clustering Time Series with Hidden Markov Models and Dynamic Time Warping", Computer Science Department, LGRC University of Massachusetts, In Proceedings of the IJCAI-99, 5 pp. (1999).
Park, Kwan Hee, Abstract "Development and evaluation of a prototype expert system for forecasting models", Mississippi State University, 1990, 1 pg.
Product Brochure, Forecast PRO, 2000, 12 pp.
Quest Software, "Funnel Web Analyzer: Analyzing the Way Visitors Interact with Your Web Site", http://www.quest.com/funnel.sub.--web/analyzer (2 pp.), Mar. 2002.
Safavi, Alex "Choosing the right forecasting software and system." The Journal of Business Forecasting Methods & Systems 19.3 (2000): 6-10. ABI/INFORM Global, ProQuest.
SAS Institute Inc., SAS/ETS User's Guide, Version 8, Cary NC; SAS Institute Inc., (1999) 1543 pages.
Seasonal Dummy Variables, Mar. 2004, http://shazam.econ.ubc.ca/intro/dumseas.htm, Accessed from: http://web.archive.org/web/20040321055948/http://shazam.econ.ubc.ca/intro- /dumseas.htm.
Simoncelli, Eero, "Least Squares Optimization," Center for Neural Science, and Courant Institute of Mathematical Sciences, pp. 1-8 (Mar. 9, 2005).
Tashman, Leonard J. et al., Abstract "Automatic Forecasting Software: A Survey and Evaluation", International Journal of Forecasting, vol. 7, Issue 2, Aug. 1991, 1 pg.
Using Predictor Variables, (1999) SAS OnlineDoc: Version 8, pp. 1325-1349, Accessed from: http://www.okstate.edu/sas/v8/saspdf/ets/chap27.pdf.
van Wijk, Jarke J. et al., "Cluster and Calendar based Visualization of Time Series Data", IEEE Symposium on Information Visualization (INFOVIS '99), San Francisco, pp. 1-6 (Oct. 25-26, 1999).
Vanderplaats, Garret N., "Numerical Optimization Techniques for Engineering Design", Vanderplaats Research & Development (publisher), Third Edition, 18 pp. (1999).
Wang, Liang et al., "An Expert System for Forecasting Model Selection", IEEE, pp. 704-709 (1992).
Atuk, Oguz et al., "Seasonal Adjustment in Economic Time Series," Statistics Department, Discussion Paper No. 2002/1, Central Bank of the Republic of Turkey, Central Bank Review, 15 pp. (2002).
Babu, G., "Clustering in non-stationary environments using a clan-based evolutionary approach," Biological Cybernetics, (Sep. 7, 1995), Springer Berlin I Heidelberg, pp. 367-374, vol. 73, Issue: 4.
Bruno, Giancarlo et al., "The Choice of Time Intervals in Seasonal Adjustment: A Heuristic Approach," Institute for Studies and Economic Analysis, Rome Italy, 14 pp. (2004).
Bruno, Giancarlo et al., "The Choice of Time Intervals in Seasonal Adjustment: Characterization and Tools," Institute for Studies and Economic Analysis, Rome, Italy, 21 pp. (Jul. 2001).
Bradley, D.C. et al., "Quantitation of measurement error with Optimal Segments: basis for adaptive time course smoothing," Am J Physiol Endocrinol Metab (Jun. 1, 1993) 264:(6) E902-E911.
Huang, N. E. et al.,"Applications of Hilbert-Huang transform to non-stationary financial time series analysis." Appl. Stochastic Models Bus. Ind., 19: 245-268 (2003).
IBM, "IBM Systems, IBM PowerExecutive Installation and User's Guide," Version 2.10, 62 pp. (Aug. 2007).

(56) References Cited

OTHER PUBLICATIONS

Kalpakis, K. et al., "Distance measures for effective clustering of ARIMA time-series,"Data Mining, 2001. ICDM 2001, Proceedings IEEE International Conference on, vol., No., pp. 273-280, (2001).

Keogh, E. et al., "An online algorithm for segmenting time series," Data Mining, 2001. ICDM 2001, Proceedings IEEE International Conference on , vol., No., pp. 289-296, (2001).

Keogh, Eamonn et al., "Segmenting Time Series: A Survey and Novel Approach," Department of Information and Computer Science, University of California, Irvine, California 92697, 15 pp. (2004).

Palpanas, T. et al, "Online amnesic approximation of streaming time series," Data Engineering, 2004. Proceedings. 20th International Conference on , vol., No., pp. 339-349, (Mar. 30-Apr. 2, 2004).

Wang Xiao-Ye; Wang Zheng-Ou; "A structure-adaptive piece-wise linear segments representation for time series," Information Reuse and Integration, 2004. IR I 2004. Proceedings of the 2004 IEEE International Conference on , vol., No., pp. 433-437, Nov. 8-10, 2004.

Yu, Lean et al., "Time Series Forecasting with Multiple Candidate Models: Selecting or Combining?" Journal of System Science and Complexity, vol. 18, No. 1, pp. 1-18 (Jan. 2005).

Wang, Ming-Yeu et al., "Combined forecast process: Combining scenario analysis with the technological substitution model," Technological Forecasting and Social Change, vol. 74, pp. 357-378 (2007).

Green, Kesten C. et al., "Structured analogies for forecasting" International Journal of Forecasting, vol. 23, pp. 365-376 (2007).

Agarwal, Deepak et al., "Efficient and Effective Explanation of Change in Hierarchical Summaries", The 13th International Conference on Knowledge Discovery and Data Mining 2007, (Aug. 12-15, 2007) 10 pages.

Hyndman, Rob J. et al., "Optimal combination forecasts for hierarchical time series", Monash University, Department of Econometrics and Business Statistics, http://www.buseco.monash.edu.au/de)Its/ebs/pubs/w)lapers/ (2007) 23 pages.

SAS Institute Inc., SAS/QC 9.1: User's Guide. Cary, NC: SAS Publications, (2004).

SAS Institute Inc., SAS/QC 13.2 User's Guide. Cary, NC: SAS Publications, (2014).

Wheeler, Donald J., and David S. Chambers. Understanding Statistical Process Control. 2nd ed. Knoxville, Tenn.: SPC Press, (1992).

Wheeler, Donald J. Advanced Topics in Statistical Process Control. Knoxville, Tenn.: SPC Press, (1995).

Montgomery, Douglas C. Introduction to Statistical Quality Control. 6th ed. Hoboken, N.J.: Wiley, (2009).

Cecil Bozarth, Ph.D., Measuring Forecast Accuracy: Approaches to Forecasting : A Tutorial, Published (Jan. 25, 2011), 3 pages.

Davis Aquilano Chase, Fundamentals of Operations Management, Chapter 9 Forecasting, The McGraw-Hill Companies, Inc. (2003) 42 pages.

DataNet Quality Systems, What are the Western Electric Rules, http://www.winspc.com/14-datanet-quality-systems/support-a-resources/179-what-are-the-western-electric-rules, (available online Apr. 14, 2014).

First Action Interview Pilot Program Pre-Interview Communication of Jun. 12, 2015 for U.S. Appl. No. 14/668,854, 6 pages.

Notice of Allowance of Oct. 5, 2015 for U.S. Appl. No. 14/668,854, 10 pages.

* cited by examiner

| Discrete Distribution Selection Criterion = AIC | | | | |
|---|---|---|---|---|
| Distribution | Zero-Value Log-Likelihood | Log-Likelihood | AIC | BIC | Selected |
| Zero-Modified Binomial | -60.215168 | -217.25543 | 438.51086 | 452.93154 | |
| Zero-Modified Geometric | -60.215168 | -236.04996 | 476.09991 | 490.52059 | |
| Zero-Modified Poisson | -60.215168 | -216.33209 | 436.66418 | 451.08486 | Yes |

FIG. 25

| ZMPOISSON Parameter Estimates |||||||
|---|---|---|---|---|---|---|
| Parameter | Estimate | Standard Error | t Value | Approx Pr > \|t\| | 95% Confidence Limits ||
| p0M | 0.29000 | 0.04538 | 6.39 | <.0001 | 0.20106 | 0.37894 |
| lambda | 4.84903 | 0.02654 | 182.68 | <.0001 | 4.79700 | 4.90105 |

FIG. 26A   ↖ 2600A

| ZMPOISSON Distribution Estimates for Units |||||
|---|---|---|---|---|
| Mean | Variance | Standard Error | 95% Confidence Limits ||
| 3.47000 | 8.25522 | 2.87319 | 0 | 8.00000 |

| Model Selection Criterion = AIC |||
|---|---|---|
| Model | Statistic | Selected |
| Seasonal Exponential Smoothing | 171.71847 | Yes |
| Winters Method (Additive) | 173.61427 | |
| Winters Method (Multiplicative) | | |

SYSTEMS AND METHODS FOR TIME SERIES ANALYSIS TECHNIQUES UTILIZING COUNT DATA SETS

CROSS-REFERENCE TO RELATED APPLICATIONS

The present disclosure claims the benefit of priority under 35 U.S.C. §119(e) to U.S. Provisional Application No. 62/107,761 filed Jan. 26, 2015, U.S. Provisional Application No. 62/116,507 filed Feb. 15, 2015, U.S. Provisional Application No. 62/128,965, filed Mar. 5, 2015, U.S. Provisional Application No. 62/128,996 filed Mar. 5, 2015, U.S. Provisional Application No. 62/130,771 filed Mar. 10, 2015, and U.S. Provisional Application No. 62/146,532 filed Apr. 13, 2015, the entireties of which are incorporated herein by reference.

This application is also related to and incorporates by reference for all purposes the full disclosure of co-pending U.S. patent application Ser. No. 13/786,838, entitled "DEVICES FOR FORECASTING RATIOS IN HIERARCHIES".

TECHNICAL FIELD

The present disclosure generally relates to systems and methods for time series analysis techniques utilizing count data sets.

BACKGROUND

Many organizations need to predict future events using large numbers of time series that are discretely valued. These time series, called "count series," fall approximately between continuously-valued time series, for which there are many predictive techniques (ARIMA, UCM, ESM, and others), and intermittent time series, for which there are few predictive techniques (e.g., Croston's method). Most traditional time series analysis techniques assume that the time series values are continuously distributed. When a time series takes on small, discrete values (e.g., 0, 1, 2, 3, etc.), this assumption of continuity is unrealistic.

SUMMARY

In accordance with the teaching provided herein, systems, methods, and computer-program products are provided herein for adjusting a set of predicted future data points for a time series data set.

For example, a system is provided that includes a processor and a non-transitory computer readable storage medium containing instructions that, when executed with the processor, cause the processor to perform operations. The operations include receiving a time series data set, wherein the time series data set includes a plurality of data points that correspond to a plurality of discrete values. The operations further include generating a set of counts for the time series data set by analyzing the time series data, wherein a count corresponds to a number of instances of a particular discrete value in the time series data set. The operations further include automatically selecting an optimal discrete probability distribution for the set of counts from a set of candidate discrete probability distributions based on a selection criterion. The operations further include generating a set of parameters corresponding to the optimal discrete probability distribution. The operations further include selecting a statistical model for the time series data set, wherein selecting the statistical model includes using a set of statistical models and the selection criterion. The operations further include generating the set of predicted future data points for the time series data set, wherein generating the set of predicted future data points includes using the selected statistical model. The operations further include adjusting the set of predicted future data points for the time series data set, wherein adjusting the set of predicted future data points includes using the set of parameters corresponding to the optimal discrete probability distribution. The operations further include using the adjusted set of predicted future data points to provide a predicted future data point based on received user input associated with the data set.

In another example, a computer-program product tangibly embodied in a non-transitory machine-readable storage medium is provided that includes instructions that cause a data processing apparatus to receive a time series data set, wherein the time series data set includes a plurality of data points that correspond to a plurality of discrete values. The instructions further cause the data processing apparatus to generate a set of counts for the time series data set by analyzing the time series data, wherein a count corresponds to a number of instances of a particular discrete value in the time series data set. The instructions further cause the data processing apparatus to automatically select an optimal discrete probability distribution for the set of counts from a set of candidate discrete probability distributions based on a selection criterion. The instructions further cause the data processing apparatus to generate a set of parameters corresponding to the optimal discrete probability distribution. The instructions further cause the data processing apparatus to select a statistical model for the time series data set, wherein selecting the statistical model includes using a set of statistical models and the selection criterion. The instructions further cause the data processing apparatus to generate the set of predicted future data points for the time series data set, wherein generating the set of predicted future data points includes using the selected statistical model. The instructions further cause the data processing apparatus to adjust the set of predicted future data points for the time series data set, wherein adjusting the set of predicted future data points includes using the set of parameters corresponding to the optimal discrete probability distribution. The instructions further cause the data processing apparatus to use the adjusted set of predicted future data points to provide a predicted future data point based on received user input associated with the data set.

In another example, a computer-implemented method is provided that includes receiving a time series data set, wherein the time series data set includes a plurality of data points that correspond to a plurality of discrete values. The method further includes generating a set of counts for the time series data set by analyzing the time series data, wherein a count corresponds to a number of instances of a particular discrete value in the time series data set. The method further includes automatically selecting an optimal discrete probability distribution for the set of counts from a set of candidate discrete probability distributions based on a selection criterion. The method further includes generating a set of parameters corresponding to the optimal discrete probability distribution. The method further includes selecting a statistical model for the time series data set, wherein selecting the statistical model includes using a set of statistical models and the selection criterion. The method further includes generating the set of predicted future data points for the time series data set, wherein generating the set of predicted future data points includes using the selected statistical model. The method further includes adjusting the set of predicted future data points for the time series data set, wherein adjusting the set of predicted future data points includes using the set of parameters corresponding to the optimal discrete probability distribution. The method further includes using the adjusted set of predicted future data points to provide a predicted future data point based on received user input associated with the data set.

BRIEF DESCRIPTION OF THE DRAWINGS

The present disclosure is described in conjunction with the appended figures:

FIG. 25 illustrates an example chart of selected distribution selection statistics, in accordance with at least one embodiment.

FIG. 26A illustrates an example table that includes a set of parameters generated for an optimal discrete probability distribution, in accordance with at least one embodiment.

FIG. 26B illustrates an example table that includes a set of distribution estimates for a discrete probability distribution, in accordance with at least one embodiment.

FIG. 26C illustrates an example table indicating a statistical fit of a number of exponential smoothing models to a data set, in accordance with at least one embodiment.

Like reference numbers and designations in the various drawings indicate like elements.

DETAILED DESCRIPTION

Figure 1:
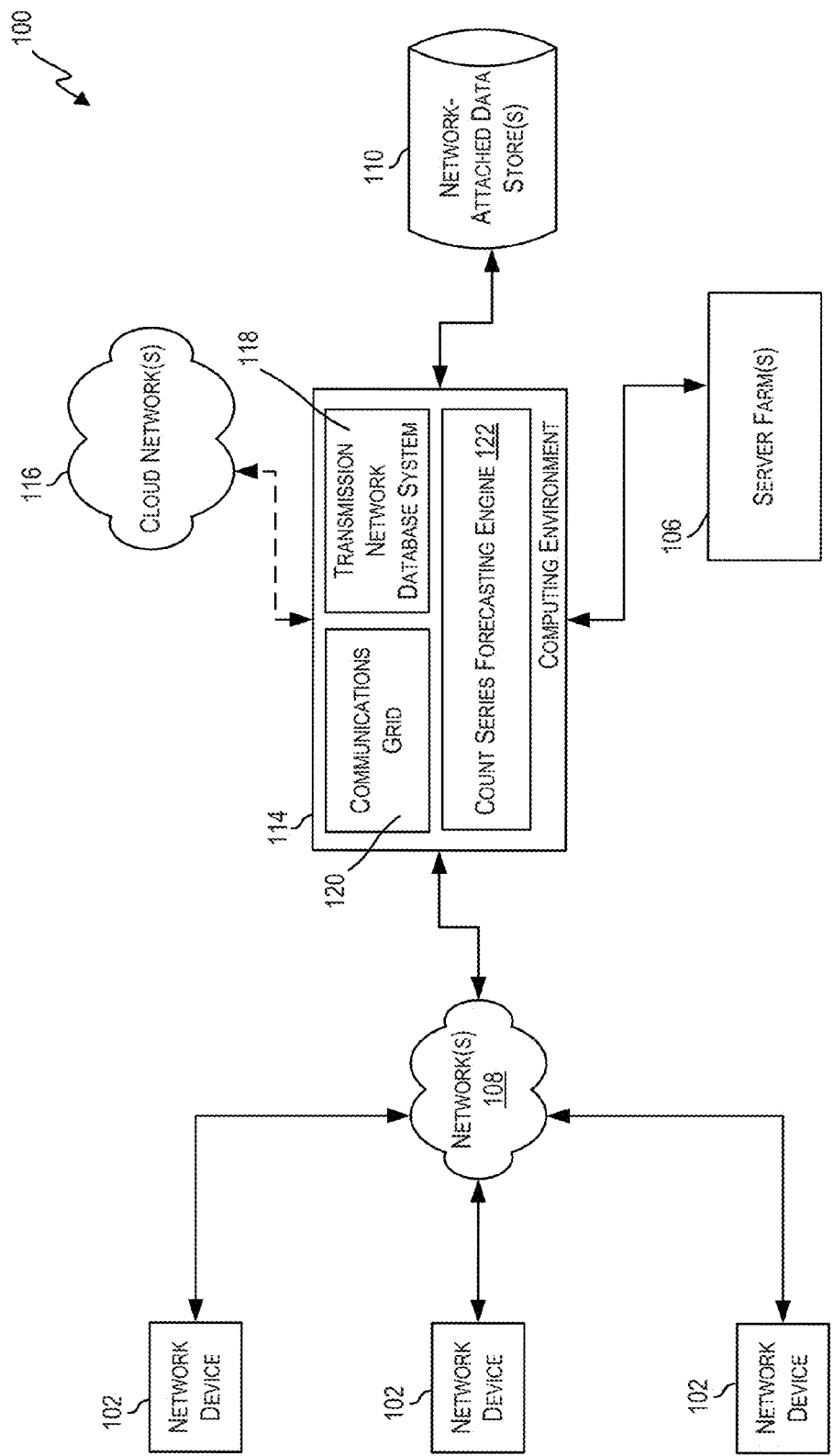
FIG. 1 illustrates a block diagram that provides an illustration of the hardware components of a computing system, according to some embodiments of the present technology.

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Predictive modeling can refer to a number of techniques used in predictive analytics that have a common goal of finding a relationship between a target, a response (e.g., a dependent variable), and various predictors (e.g., an independent variables. Predictive analytics use predictive modeling, machine learning, and data mining techniques that analyze current and historical facts to make predictions about future, or otherwise unknown, events. A predictive model (e.g., a statistical model) may be made up of a number of predictors, which are variable factors that are likely to influence subsequent data points. In predictive modeling, data is collected for the relevant predictors, a predictive model is formulated, predictions are made and the model is validated (or revised) as additional data becomes available. The model may employ a simple linear equation or a complex neural network, for example. A "time series," as used herein, is intended to refer to a sequence of data points, typically consisting of successive measurements made over time. References to a "time series" are intended to refer to a single time series and/or multiple time series unless otherwise specified.

Certain aspects of the disclosed subject matter relate to system and methods for automated count series forecasting. As used herein, a "count series" is intended to refer to a time series data set for which the data points included in the data set take on discrete values (e.g., 0, 1, 2, 3, and the like). In many cases, although not always, the discrete values may be small in value, such as integers under ten, for example.

Current time series analysis techniques include, for example, Exponential Smoothing Models (ESM), Auto-Regressive Integrated Moving Average Models either with or without exogenous variables (ARIMA[X]), Unobserved Component Models (UCM), Intermittent Demand Models (IDM), and the like. Most traditional time series analysis techniques assume that the time series values are continuously distributed. For example, ARIMA models assume that the time series values are generated by continuous-valued white noise passing through various types of filters. A continuous-valued time series also refers to a time series that includes continuous variables. A continuous variable can take on any real value between two specified values, wherein a discrete variable cannot. For example, suppose a fire department mandates that all fire fighters must weigh between 150 and 250 pounds. The weight of the fire fighter would be an example of a continuous variable since the fire fighter's weight could take on any real value between 150 and 250 pounds.

Discrete probability distributions include discrete variables having discrete values rather than continuous variables. For example, a coin may be flipped a number of times and the number of heads may be counted. The number of heads could be any integer value between 0 and the number of flips. However, it could not be any number between 0 and the number of flips. There could not, for example, be 2.5 heads. Thus, the number of heads must be a discrete variable.

In at least one example, using discrete probability distributions with count series analysis can better predict future values, and, most importantly, more realistic confidence intervals than current techniques. In addition, some discrete probability distributions have zero-modified versions where there are more or fewer zero values than expected under the usual unmodified version of the distribution. As discussed herein, "zero-modified" is intended to refer to a zero-inflated probability distribution (e.g., a probability distribution having an excess of zero values) and/or a zero-deflated probability distribution (e.g., a probability distribution where zero values are discarded or otherwise ignored, or a probability distribution where zero values are less numerous than expected). Thus, a realistic probability distribution is used to account for the zero values in a time series. Techniques herein are directed to provide a more accurate predictive model for a count series data set than previously-utilized techniques.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

The data transmission network 100 may also include computing environment 114. The computing environment 114 may be a specialized computer or other machine that processes the data received within the data transmission network 100. The data transmission network 100 also includes one or more network devices 102. The network devices 102 may include client devices that attempt to communicate with computing environment 114. For example, the network devices 102 may send data (e.g., one or more data points in a data set) to the computing environment 114 to be processed and/or the network devices 102 may send signals to the computing environment 114 to control different aspects of the computing environment 114 or the data (e.g., a count series data set) it is processing, among other reasons. The network devices 102 may interact with the computing environment 114 through a number of ways, such as, for example, over one or more of the networks 108.

As shown in FIG. 1, computing environment 114 may include one or more other systems. For example, computing environment 114 may include a database system 118, and/or a communications grid 120, and/or a count series forecasting engine 122. The count series forecasting engine 122, as described further in this description, may be stored the network-attached data stores 110, or may exist as a stand-alone service external to the computing environment 114.

Figure 8:
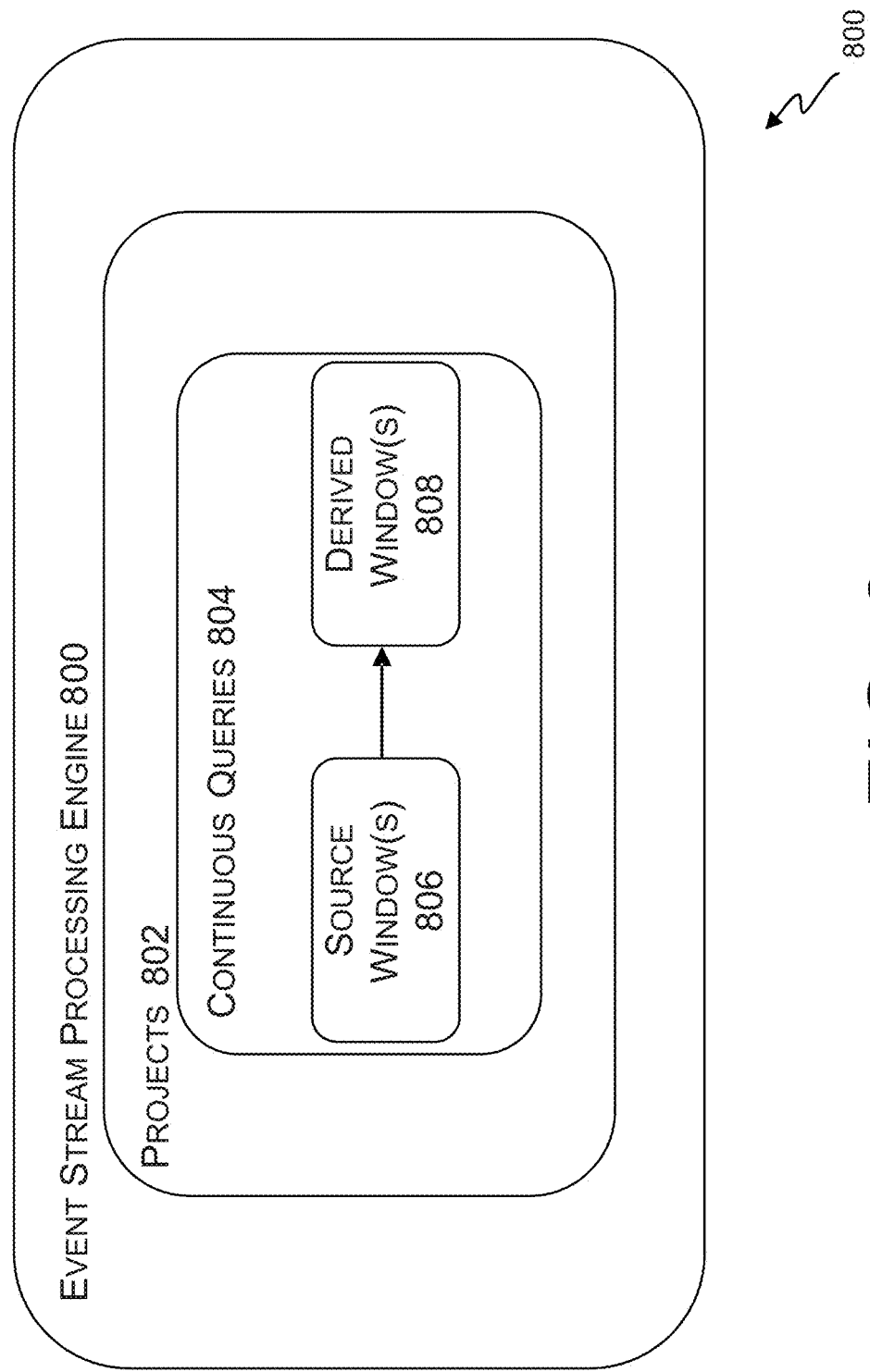
FIG. 8 illustrates a block diagram including components of an Event Stream Processing Engine (ESPE), according to embodiments of the present technology.
Figure 9:
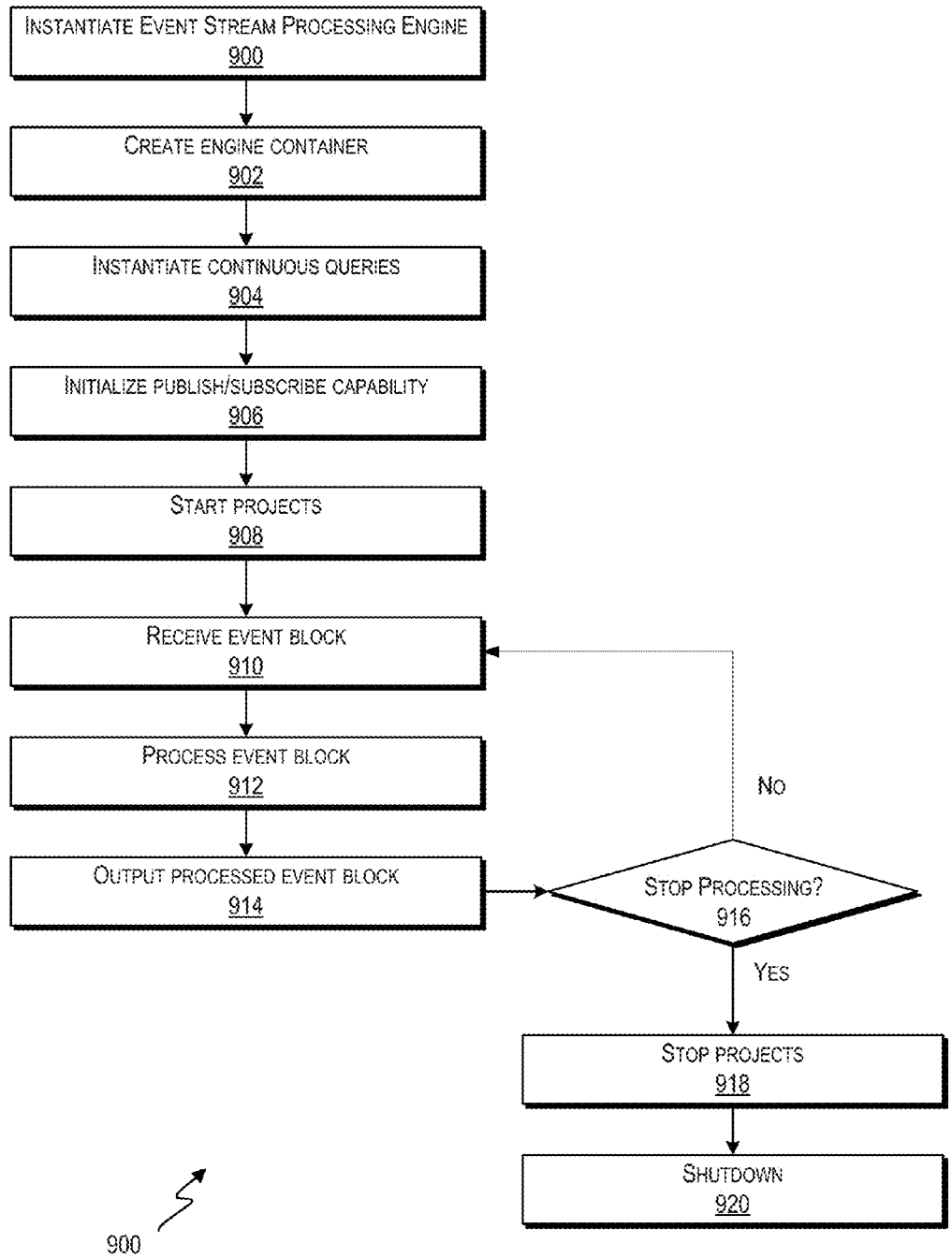
FIG. 9 illustrates a flow chart showing an example process including operations performed by an event stream processing engine, according to some embodiments of the present technology.
Figure 10:
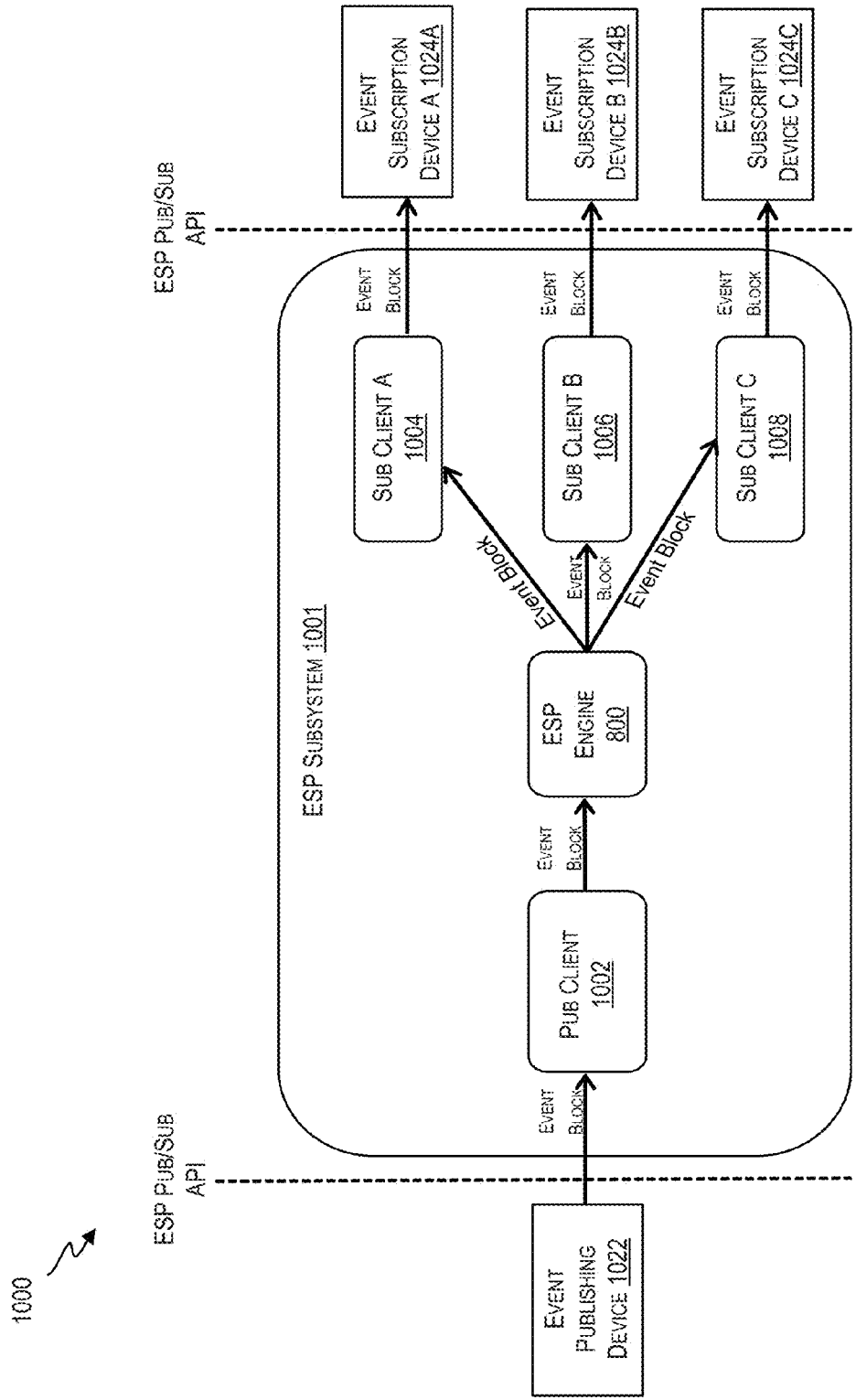
FIG. 10 illustrates an ESP system interfacing between a publishing device and multiple event subscribing devices, according to embodiments of the present technology.

In some embodiments, the network devices 102 may provide a large amount of data either all at once or streaming over a period of time (e.g., using event stream processing (ESP), described further with respect to FIGS. 8-10), to the computing environment 114 via the networks 108. For example, the network devices 102 may include network computers, sensors, databases, or other devices that may transmit or otherwise provide data to the computing environment 114. For example, the network devices 102 may include local area network devices, such as routers, hubs, switches, or other computer networking devices. These devices may provide a variety of stored or generated data (e.g., a count series data set), such as network data or data specific to the network devices themselves. The network devices 102 may also include sensors that monitor their environment or other devices to collect data regarding that environment or those devices, and such network devices may provide data they collect over time. The network devices 102 may also include devices within the internet of things, such as devices within a home automation network. Some of these devices may be referred to as edge devices, and may involve edge computing circuitry. Data may be transmitted by the network devices 102 directly to the computing environment 114 or to network-attached data stores, such as the network-attached data stores 110 for storage so that the data may be retrieved later by the computing environment 114 or other portions of the data transmission network 100.

The data transmission network 100 may also include one or more of the network-attached data stores 110. The network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated in real time. In this non-limiting situation, the computing environment 114 may be configured to retain the processed information within memory so that responses can be generated for the user at different levels of detail as well as allow a user to interactively query against this information.

The network-attached data stores 110 may store a variety of different types of data (e.g., count series data set(s)) organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as inventory data (e.g., a database containing records identifying products information for items being stored in an inventory) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically structure) that data, such that the structured data is tailored to a type of further analysis that a user wishes to perform on the data (e.g., count series analysis). For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

The data transmission network 100 may also include one or more server farms 106. The computing environment 114 may route select communications or data to the one or more server farms 106 or one or more servers within the one or more server farms 106. The one or more server farms 106 can be configured to provide information in a predetermined manner. For example, the one or more server farms 106 may access data to transmit in response to a communication. The one or more server farms 106 may be separately housed from each other device within the data transmission network 100, such as the computing environment 114, and/or may be part of a device or system.

The one or more server farms 106 may host a variety of different types of data processing as part of the data transmission network 100. The one or more server farms 106 may receive a variety of different data from the network devices 102, from the computing environment 114, from the cloud network 116, or from other sources. For example, one or more count series data sets may be obtained and/or received from the one or more server farms 106. The data (e.g., the one or more count series data sets) may have been obtained or collected from one or more sensors, as inputs from a control database, or may have been received as inputs from an external system or device. The one or more server farms 106 may assist in processing the data by turning raw data into processed data based on one or more rules implemented by the one or more server farms 106. For example, sensor data may be analyzed to determine changes in an environment over time or in real-time.

The data transmission network 100 may also include the cloud network 116. The cloud network 116 may include a cloud infrastructure system that provides cloud services. In certain embodiments, services provided by the cloud network 116 may include a host of services that are made available to users of the cloud infrastructure system on demand. The cloud network 116 is shown in FIG. 1 as being connected to the computing environment 114 (and therefore having the computing environment 114 as its client or user), but the cloud network 116 may be connected to, or utilized by, any of the devices in FIG. 1. Services provided by the cloud network 116 can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server, and system in FIG. 1 is shown as a single device, it will be appreciated that multiple devices may instead be used. For example, a set of network devices 102 can be used to transmit various communications from a single user, or remote server 140 may include a server stack. As another example, data may be processed as part of the computing environment 114.

Each communication within the data transmission network 100 (e.g., between client devices, between the one or more server farms 106 and the computing environment 114, or between a server and a device) may occur over one or more networks 108. The one or more networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network of the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the networks 108, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, the computing environment 114 may include a count series forecasting engine 122, a communications grid 120, and/or a database system 118 (e.g., a transmission network data base system). Count series forecasting engine 122 may be a computing system for performing operations related providing one or more predicted future data points for a count series data set and/or for monitoring a count series data set. The communications grid 120 may be a grid-based computing system for processing large amounts of data. The database system 118 may be for managing, storing, and retrieving large amounts of data that are distributed to and stored in the one or more network-attached data stores 110 or other data stores that reside at different locations within the database system 118. The count series forecasting engine 122, the compute nodes in the communications grid 120 and/or the database system 118 may share the same processor hardware, such as processors that are located within the computing environment 114.

Figure 2:
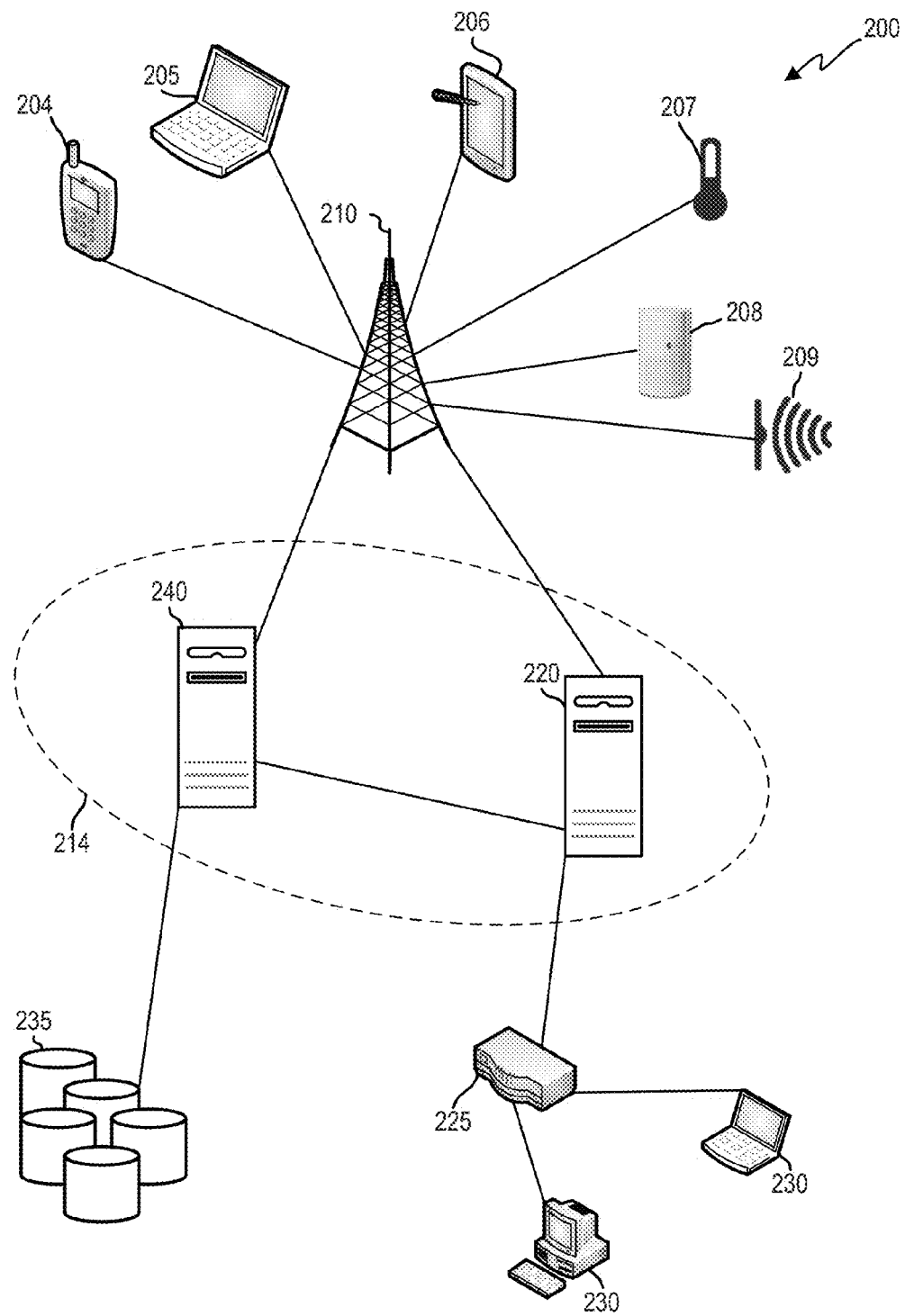
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network (e.g., the one or more networks 108 of FIG. 1), according to embodiments of the present technology. As noted, each communication within the data transmission network 100 of FIG. 1 may occur over one or more networks. System 200 includes a network device 204 configured to communicate with a variety of types of client devices, for example client devices 230, over a variety of types of communication channels.

As shown in FIG. 2, the network device 204 can transmit a communication over a network (e.g., a cellular network via a base station 210). The communication can be routed to another network device, such as the network devices 205-209, via the base station 210. The communication can also be routed to the computing environment 214 (e.g., the computing environment 114 of FIG. 1) via base station 210. For example, the network device 204 may collect data either from its surrounding environment or from other network devices (such as the network devices 205-209) and transmit that data to the computing environment 214.

Although the network devices 204-209 are shown in FIG. 2 as a mobile phone, laptop computer, tablet computer, temperature sensor, motion sensor, and audio sensor respectively, the network devices 204-209 may be or may include sensors that are sensitive to detecting aspects of their environment. For example, the network devices 204-209 may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices 204-209 may detect and record data related to the environment that it monitors, and transmit that data to the computing environment 214 (e.g., the computing environment 114 of FIG. 1).

As noted, one type of system that may include various sensors that collect data to be processed and/or transmitted to a the computing environment 214 according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a the computing environment 214 according to certain embodiments includes a home automation or similar automated network in a different environment, such as an office space, school, public space, sports venue, or a variety of other locations. The network devices 204-209 in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, the network devices 204-209 may include a home automation switch that may be coupled with a home appliance. In another embodiment, the network devices 204-209 can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment 214 according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 214, or before deciding whether to transmit data to the computing environment 214. For example, the network devices 204-209 may determine whether data collected meets certain rules, for example by comparing data or values calculated from the data and comparing that data to one or more thresholds. The network devices 204-209 may use this data and/or comparisons to determine if the data should be transmitted to the computing environment 214 for further use or processing.

The computing environment 214 may include the machine 220 and the machine 240. Although computing environment 214 is shown in FIG. 2 as having two machines, such as the machines 220 and the machines 240, the computing environment 214 may have only one machine or may have more than two machines. The machines that make up the computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within the computing environment 214 to distribute data to them. Since the network devices 204-209 may transmit data to the computing environment 214, that data may be received by the computing environment 214 and subsequently stored within those storage devices. Data used by the computing environment 214 may also be stored in data stores 235, which may also be a part of or connected to the computing environment 214.

The computing environment 214 can communicate with various devices via one or more routers 225 or other inter-network or intra-network connection components. For example, the computing environment 214 may communicate with the client devices 230 via one or more routers 225. The computing environment 214 may collect, analyze and/or store data from or pertaining to communications, client device operations, client rules, and/or user-associated actions stored at the one or more data stores 235. Such data may influence communication routing to the devices within the computing environment 214, how data is stored or processed within the computing environment 214, among other actions.

Notably, various other devices can further be used to influence communication routing and/or processing between devices within the computing environment 214 and with devices outside of the computing environment 214. For example, as shown in FIG. 240, the computing environment 214 may include a web server (e.g., the machines 240). Thus, the computing environment 214 can retrieve data of interest, such as client information (e.g., product information, client rules, etc.), technical product details, news, current or predicted weather, and so on.

In addition to the computing environment 214 collecting data (e.g., as received from the network devices 204-209, such as sensors, and client devices or other sources) to be processed as part of a big data analytics project, it may also receive data in real-time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within the computing environment 214 may also perform pre-analysis on data it receives to determine if the data received should be processed as part of an ongoing project. The data received and collected by the computing environment 214, no matter what the source or method or timing of receipt, may be processed over a period of time for a client to determine results data based on the client's needs and rules.

Figure 3:
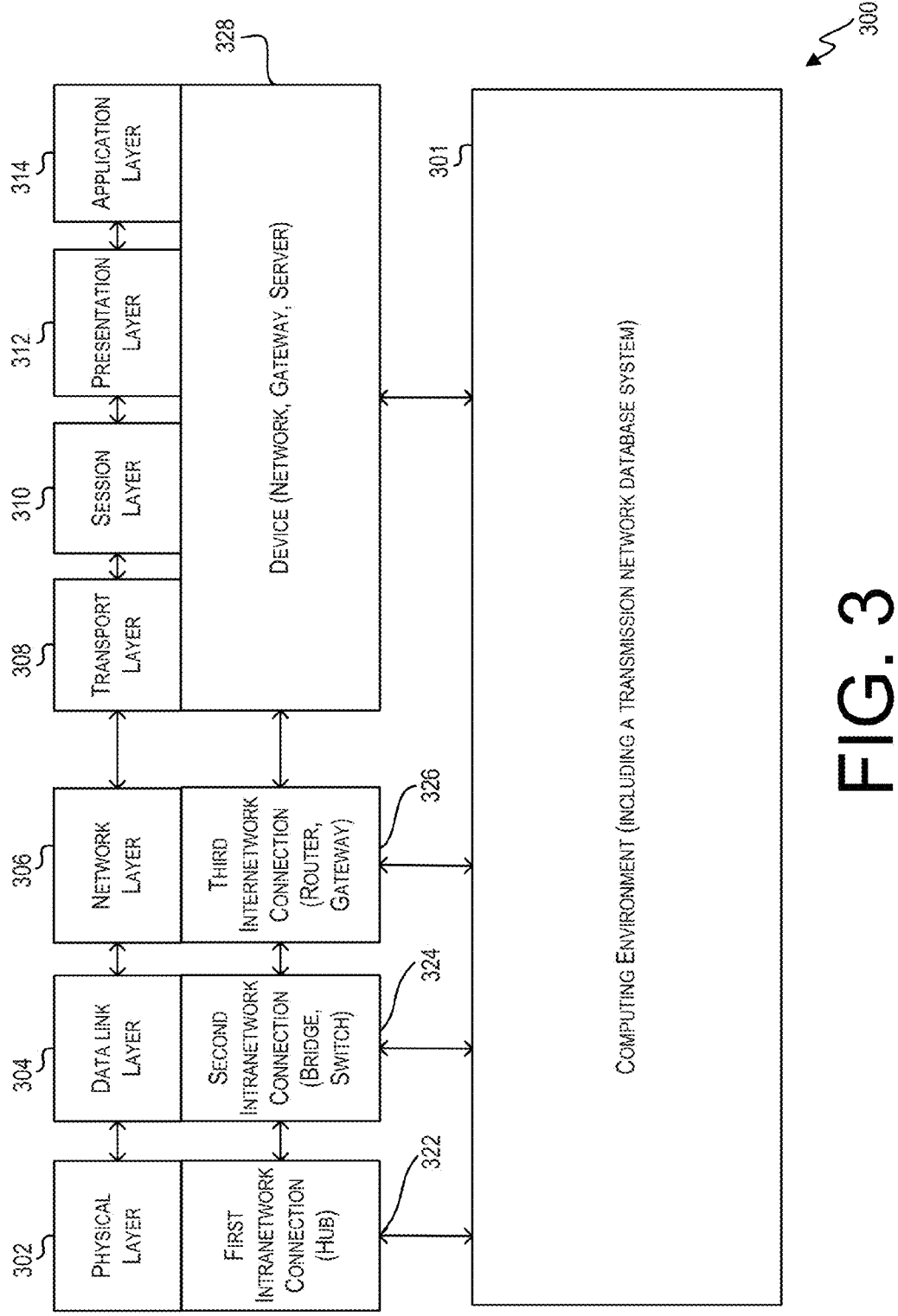
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 301 (e.g., the computing environment 214 in FIG. 2) may communicate with other devices in its network, and control how communications between the computing environment 301 and other devices are executed and under what conditions.

The model can include layers 302-314. The layers are arranged in a stack. Each layer in the stack serves the layer one level higher than it (except for the application layer 314, which is the highest layer), and is served by the layer one level below it (except for the physical layer 304, which is the lowest layer). The physical layer 304 is the lowest layer because it receives and transmits raw bites of data, and is the farthest layer from the user in a communications system. On the other hand, the application layer 314 is the highest layer because it interacts directly with a software application.

As noted, the model includes a physical layer 302. The physical layer 302 represents physical communication, and can define parameters of that physical communication. For example, such physical communication may come in the form of electrical, optical, or electromagnetic signals. Physical layer 302 also defines protocols that may control communications within a data transmission network.

The data link layer 304 defines links and mechanisms used to transmit (i.e., move) data across a network. The data link layer manages node-to-node communications, such as within a grid computing environment. The data link layer 304 can detect and correct errors (e.g., transmission errors in the physical layer 302). The data link layer 304 can also include a media access control (MAC) layer and logical link control (LLC) layer.

The network layer 306 defines the protocol for routing within a network. In other words, the network layer 306 coordinates transferring data across nodes in a same network (e.g., such as a grid computing environment). The network layer 306 can also define the processes used to structure local addressing within the network.

The transport layer 308 can manage the transmission of data and the quality of the transmission and/or receipt of that data. The transport layer 308 can provide a protocol for transferring data, such as, for example, a Transmission Control Protocol (TCP). The transport layer 308 can assemble and disassemble data frames for transmission. The transport layer 308 can also detect transmission errors occurring in the layers below it.

The session layer 310 can establish, maintain, and manage communication connections between devices on a network. In other words, the session layer 310 controls the dialogues or nature of communications between network devices on the network. The session layer 310 may also establish checkpointing, adjournment, termination, and restart procedures.

The presentation layer 312 can provide translation for communications between the application layer 314 and the network layer 306. In other words, this layer may encrypt, decrypt and/or format data based on data types known to be accepted by the application layer 314 or the network layer 306.

The application layer 314 interacts directly with software applications and end users, and manages communications between them. The application layer 314 can identify destinations, local resource states or availability and/or communication content or formatting using the applications.

The intra-network connection components 322 and 324 are shown to operate in lower levels, such as physical layer 302 and link layer 304, respectively. For example, a hub can operate in the physical layer 302, a switch can operate in the physical layer 302, and a router can operate in the network layer 306. The internetwork connection components 326 and 328 are shown to operate on higher levels, such as layers 306-314. For example, routers can operate in the network layer 306 and network devices (e.g., the network devices 204-209 of FIG. 2) can operate in the transport, session, presentation, and application layers.

As noted, a the computing environment 301 can interact with and/or operate on, in various embodiments, one, more, all or any of the various layers. For example, the computing environment 301 can interact with a hub (e.g., via the data link layer 304) so as to adjust which devices the hub communicates with. The physical layer 302 may be served by the data link layer 304, so it may implement such data from the data link layer 304. For example, the computing environment 301 may control from which devices it will receive data. For example, if the computing environment 301 knows that a certain network device has turned off, broken, or otherwise become unavailable or unreliable, the computing environment 301 may instruct the hub to prevent any data from being transmitted to the computing environment 301 from that network device. Such a process may be beneficial to avoid receiving data that is inaccurate or that has been influenced by an uncontrolled environment. As another example, the computing environment 301 can communicate with a bridge, switch, router or gateway and influence which device within the system (e.g., the system 200 of FIG. 2) the component selects as a destination. In some embodiments, the computing environment 301 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 301 may be a part of a communications grid environment (e.g., the communications grid 120 of FIG. 1), the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
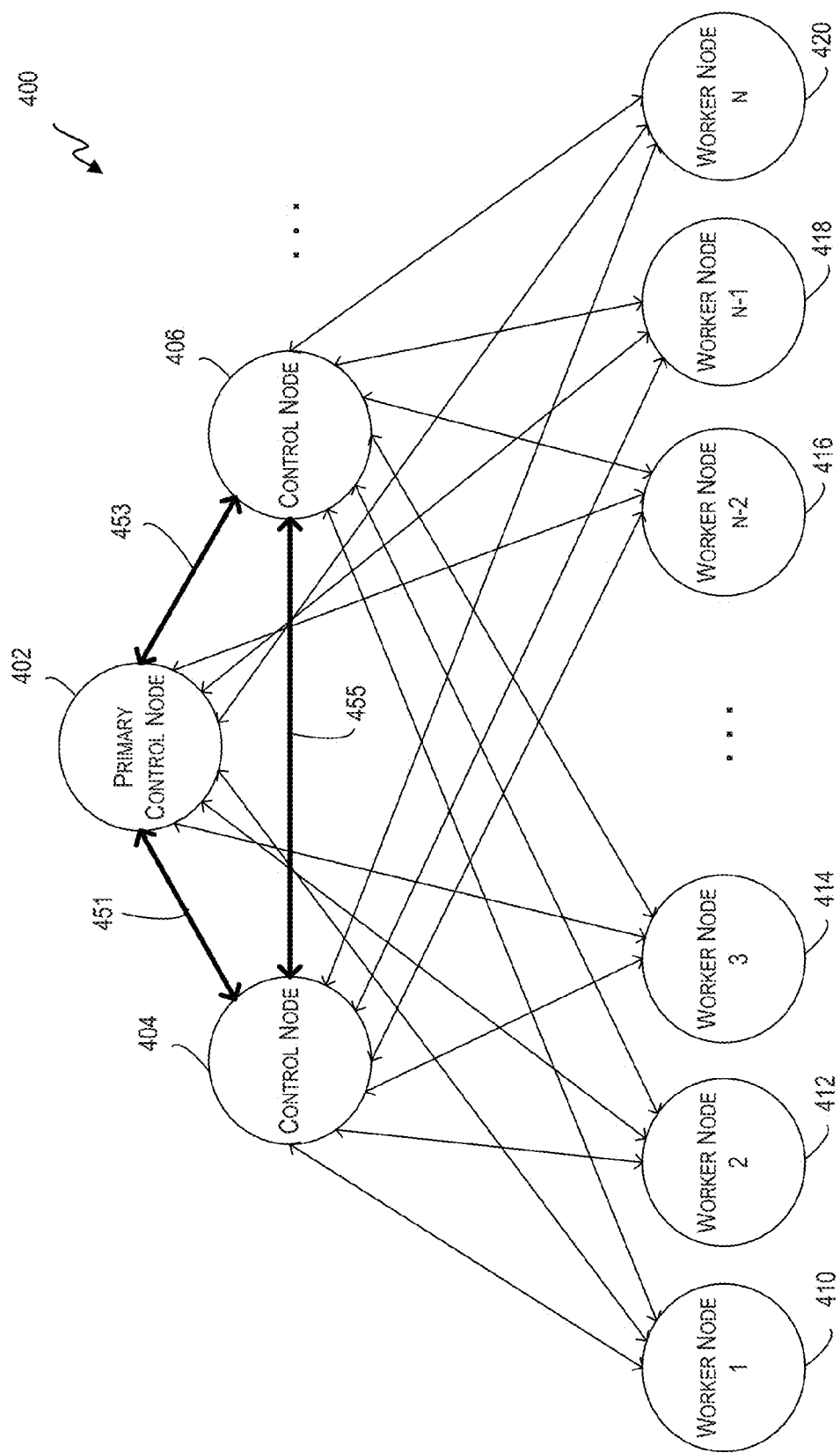
FIG. 4 illustrates a communications grid computing system including a variety of control and worker nodes, according to some embodiments of the present technology.

FIG. 4 illustrates a communications grid computing system 400 (e.g., the communications grid 120 of FIG. 1) including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less control nodes.

Communications grid computing system (or just "communications grid") 400 (e.g., the communications grid 120 of FIG. 1) also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid 400 to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid 400, whether they are other worker nodes controlled by the control node that controls the worker node, or worker nodes that are controlled by other control nodes in the communications grid 400.

A control node may connect with an external device with which the control node may communicate (e.g., a grid user, such as a server or computer, may connect to a controller of the grid). For example, a server or computer may connect to control nodes and may transmit a project or job to the node. The project may include a data set (e.g., a count series data set that includes data points that correspond to a number of discrete values). The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid 400 were to include only a single control node, and the control node were to fail (e.g., the control node is shut off or breaks) then the communications grid as a whole may fail and any project or job being run on the communications grid 400 may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node 402 may open a pair of listening sockets, for example. A socket may be used to accept work requests from clients, and the second socket may be used to accept connections from other grid nodes). The primary control node 402 may be provided with a list of other nodes (e.g., other machines, computers, servers) that will participate in the communications grid 400, and the role that each node will fill in the communications grid 400. Upon startup of the primary control node 402 (e.g., the first node on the grid), the primary control node 402 may use a network protocol to start the server process on every other node in the grid. Command line parameters, for example, may inform each node of one or more pieces of information, such as: the role that the node will have in the communications grid 400, the host name of the primary control node 402, the port number on which the primary control node 402 is accepting connections from peer nodes, among others. The information may also be provided in a configuration file, transmitted over a secure shell tunnel, recovered from a configuration server, among others. While the other machines in the communications grid 400 may not initially know about the configuration of the communications grid 400, that information may also be sent to each other node by the primary control node. Updates of the grid information may also be subsequently sent to those nodes.

For any control node other than the primary control node 402 added to the communications grid 400, the primary control node 402 may open, for example, three sockets. The first socket may accept work requests from clients, the second socket may accept connections from other grid members, and the third socket may connect (e.g., permanently) to the primary control node 402. When a control node (e.g., primary control node 402) receives a connection from another control node (e.g., control node 404), it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the communications grid 400 may establish a connection to the primary control node 402 and any other control nodes on the grid. After establishing the connection, it may authenticate itself to the communications grid 400 (e.g., any control nodes, including both primary and backup, or a server or user controlling the grid). After successful authentication, the worker node may accept configuration information from a control node.

When a node joins a communications grid 400 (e.g., when the node is powered on or connected to an existing node on the communications grid 400 or both), the node is assigned (e.g., by an operating system of the grid) a universally unique identifier (UUID). This unique identifier may help other nodes and external entities (devices, users, etc.) to identify the node and distinguish it from other nodes. When a node is connected to the communications grid 400, the node may share its unique identifier with the other nodes in the communications grid 400. Since each node may share its unique identifier, each node may know the unique identifier of every other node on the communications grid 400. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The communications grid 400 may add new machines at any time (e.g., initiated from any control node). Upon adding a new node to the grid, a control node (e.g., the control node 404) may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid 400). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid 400 so that control node 404 (a backup control node) always has a recent snapshot of the communications grid 400. The snapshot or grid status may include, for example, the structure of the grid (including, for example, the worker nodes in the grid, unique identifiers of the nodes, or their relationships with the primary control node 402) and the status of a project (including, for example, the status of each worker node's portion of the project). The snapshot may also include analysis or results received from worker nodes in the communications grid 400. The backup control nodes may receive and store the backup data received from the primary control node. The backup control nodes may transmit a request for such a snapshot (or other information) from the primary control node 402, or the primary control node 402 may send such information periodically to the backup control nodes.

As noted, the backup data may allow the backup control node (e.g., control node 404) to take over as primary control node 402 if the primary control node 402 fails without requiring the grid to start the project over from scratch. If the primary control node 402 fails, the backup control node that will take over as primary control node 402 (e.g., control node 402) may retrieve the most recent version of the snapshot received from the primary control node and use the snapshot to continue the project from the stage of the project indicated by the backup data. This may prevent failure of the project as a whole.

A backup control node (e.g., control node 404) may use various methods to determine that the primary control node has failed. In one example of such a method, the primary control node 402 may transmit (e.g., periodically) a communication to the backup control node that indicates that the primary control node 402 is working and has not failed, such as a heartbeat communication. The backup control node may determine that the primary control node 402 has failed if the backup control node has not received a heartbeat communication for a certain predetermined period of time. Alternatively, a backup control node may also receive a communication from the primary control node 402 itself (before it failed) or from a worker node that the primary control node 402 has failed, for example because the primary control node 402 has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid 400 may also fail. If a worker node fails, work being performed by the failed worker node may be redistributed amongst the operational worker nodes. In an alternative embodiment, the primary control node 402 may transmit a communication to each of the operable worker nodes still on the communications grid 402 that each of the worker nodes should purposefully fail also. After each of the worker nodes fail, they may each retrieve their most recent saved checkpoint of their status and re-start the project from that checkpoint to minimize lost progress on the project being executed.

Figure 5:
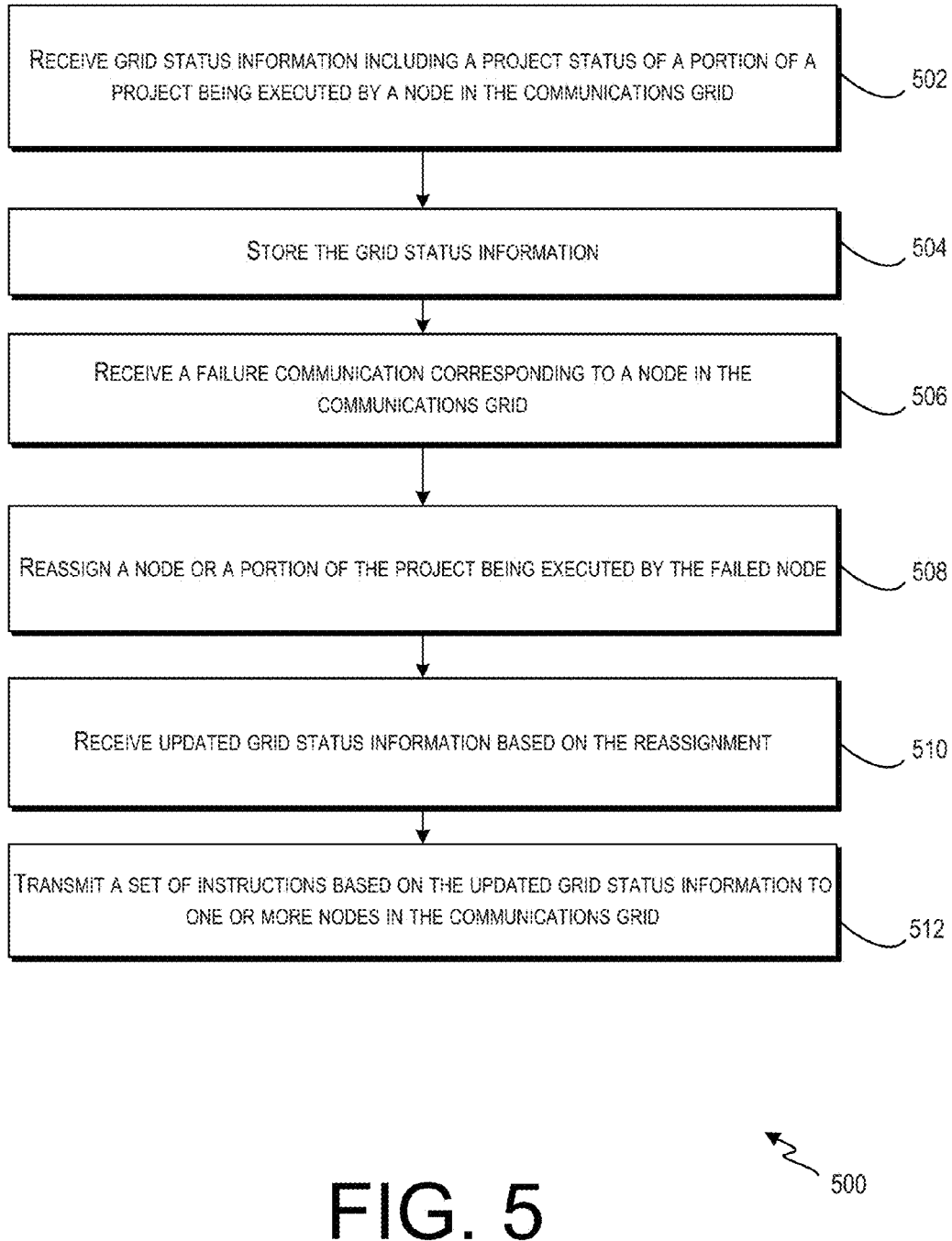
FIG. 5 illustrates a flow chart showing an example process for adjusting a communications grid or a work project in a communications grid after a failure of a node, according to some embodiments of the present technology.

FIG. 5 illustrates a flow chart showing an example process for adjusting a communications grid (e.g., communications grid 400 of FIG. 4), or a work project in the communications grid 400 after a failure of a node, according to embodiments of the present technology. The process may include, for example, receiving grid status information including a project status of a portion of a project being executed by a node in the communications grid 400, as described in operation 502. For example, a control node (e.g., a backup control node connected to a primary control node 402 and a worker node on a communications grid 400) may receive grid status information, where the grid status information includes a project status of the primary control node 402 or a project status of the worker node. The project status of the primary control node 402 and the project status of the worker node may include a status of one or more portions of a project being executed by the primary and worker nodes in the communications grid 400. The process may also include storing the grid status information, as described in operation 504. For example, a backup control node (e.g., the control node 404) may store the received grid status information locally within the control node 404. Alternatively, the grid status information may be sent to another device for storage where the control node 404 may have access to the information.

The process may also include receiving a failure communication corresponding to a node in the communications grid 400 in operation 506. For example, a node may receive a failure communication including an indication that the primary control node 402 has failed, prompting a backup control node to take over for the primary control node 402. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid 400, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid 400, as described in operation 512. The updated grid status information may include an updated project status of the primary control node 402 or an updated project status of the worker node. The updated information may be transmitted to the other nodes in the grid to update their stale stored information.

Figure 6:
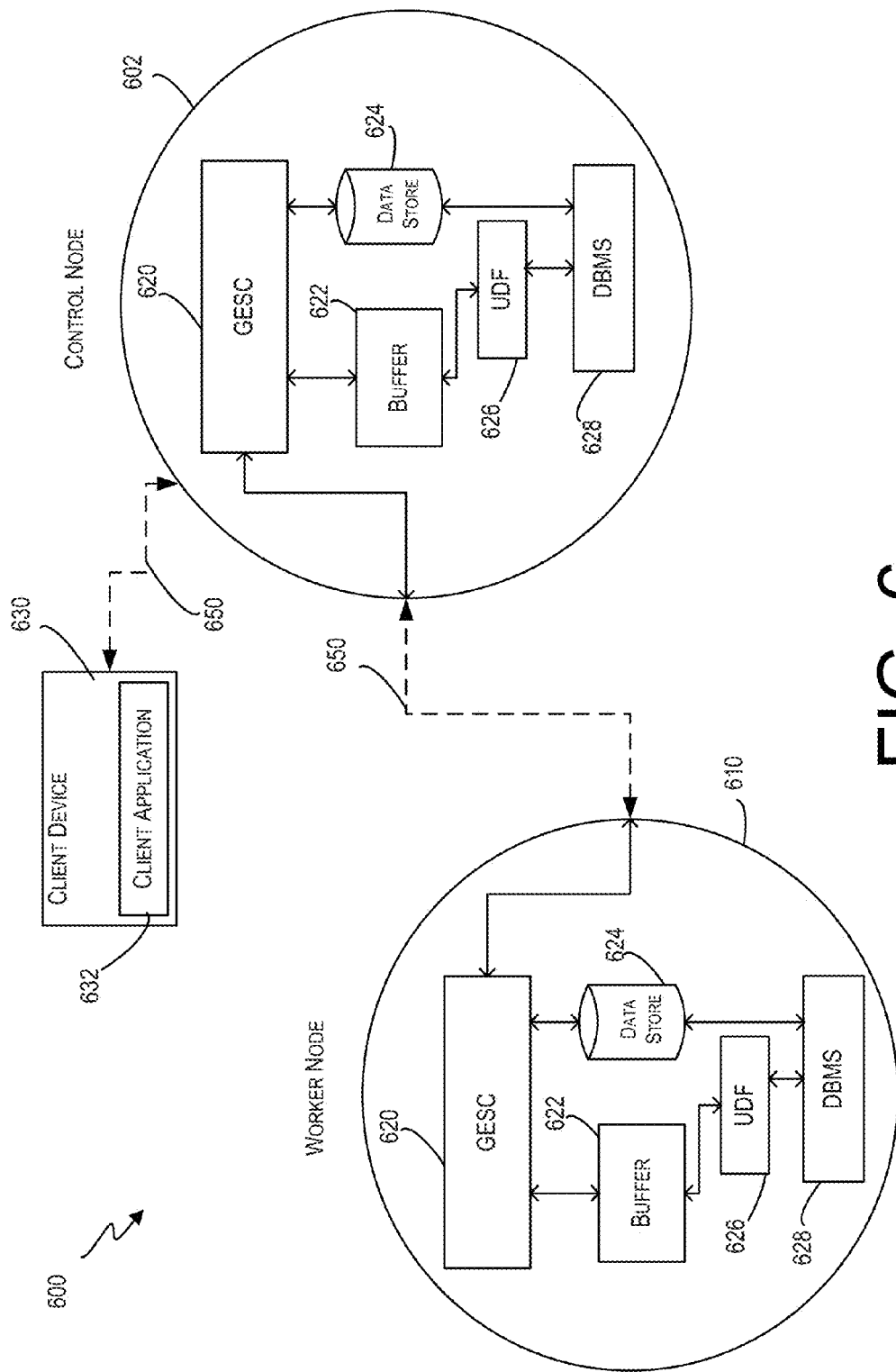
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 (e.g., communications grid 120 of FIG. 1) computing system includes one control node (control node 602 (e.g., primary control node 402 of FIG. 4)) and one worker node (worker node 610 (e.g., worker node 410 of FIG. 4)) for purposes of illustration, but may include more worker and/or control nodes. The control node 602 is communicatively connected to worker node 610 via communication path 650. Therefore, control node 602 may transmit information (e.g., related to the communications grid 120 or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each of the node 602 and the node 610 include a database management software (DBMS) 628 that executes on a database server (not shown) at control node 602 and on a database server (not shown) at worker node 610.

Each of the node 602 and the node 610 also include a data store 624. Data stores 624, similar to network-attached data stores 110 in FIG. 1 and data stores 235 in FIG. 2, are used to store data to be processed by the nodes in the computing environment. The data store 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or in real-time. In such a situation, the grid may be configured to retain the data within memory so that responses can be generated at different levels of detail and so that a client may interactively query against this information.

Each of the node 602 and the node 610 include a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the node 602 and the node 610 may be connected via a network, such as the networks 108 shown in FIG. 1. Therefore, the node 602 and the node 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the node 602 can communicate, over a communication path 652, with a client device 630. More specifically, the node 602 (a control node) may communicate with client application 632 hosted by the client device 630 to receive queries and to respond to those queries after processing large amounts of data.

DMBS 628 may control the creation, maintenance, and use of database or data structure (not shown) within the node 602 or the node 610. The database may organize data stored in the data stores 624. The DMBS 628 at the node 602 (a control node) may accept requests for data and transfer the appropriate data for the request. With such a process, collections of data may be distributed across multiple physical locations. In this example, each of the node 602 and the node 610 store a portion of the total data managed by the management system in its respective data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
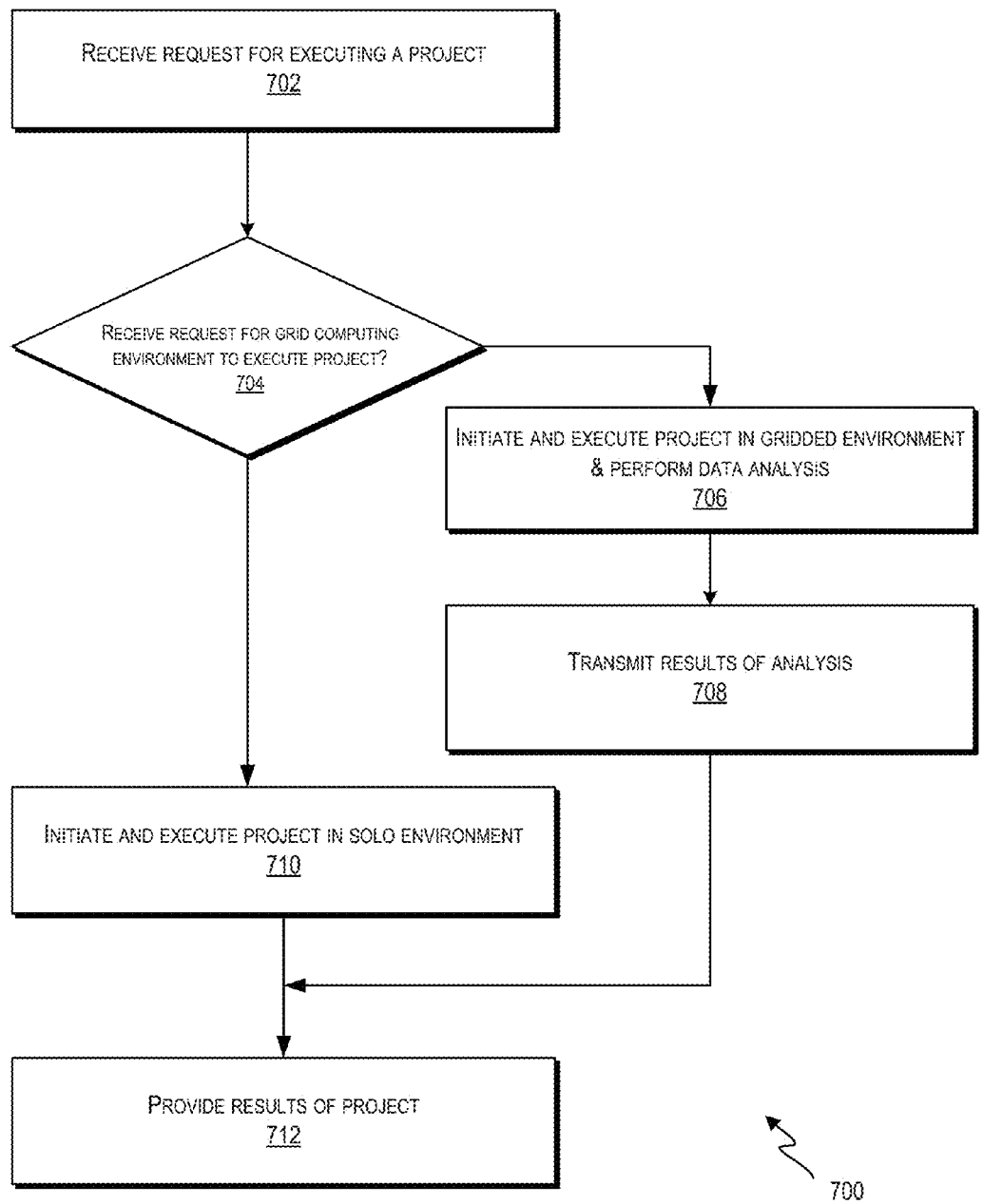
FIG. 7 illustrates a flow chart showing an example process for executing a data analysis or processing project, according to some embodiments of the present technology.

FIG. 7 illustrates a flow chart showing an example method for executing a project within a grid computing system (e.g., the communications grid 120 of FIG. 1), according to embodiments of the present technology. As described with respect to FIG. 6, the GESC at the node 602 (a control node) may transmit data with a client device (e.g., client device 630) to receive queries for executing a project and to respond to those queries after large amounts of data have been processed.

The query may be transmitted to the node 602, where the query may include a request for executing a project, as described in operation 702. The query can contain instructions on the type of data analysis to be performed in the project and whether the project should be executed using the grid-based computing environment, as shown in operation 704.

To initiate the project, the node 602 may determine if the query requests use of the grid-based computing environment to execute the project. If the determination is no, then the node 602 initiates execution of the project in a solo environment (e.g., at the node 602), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the node 602 may transmit results of the analysis yielded by the grid, as described in operation 708. Whether the project is executed in a solo or grid-based environment, the node 602 provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real-time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine (e.g., the event stream processing engine 800 of FIG. 8), according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as the machines 220 and/or the machines 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 1001, event publishing device 1022, an event subscribing device A 1024a, an event subscribing device B 1024b, and an event subscribing device C 1024c. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device.

In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 804, subscribing client B 806, and subscribing client C 808 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or affected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

FIGS. 11-26 provide further aspects to analyzing count series data by the count series forecasting engine 122 of FIG. 1.

Figure 11:
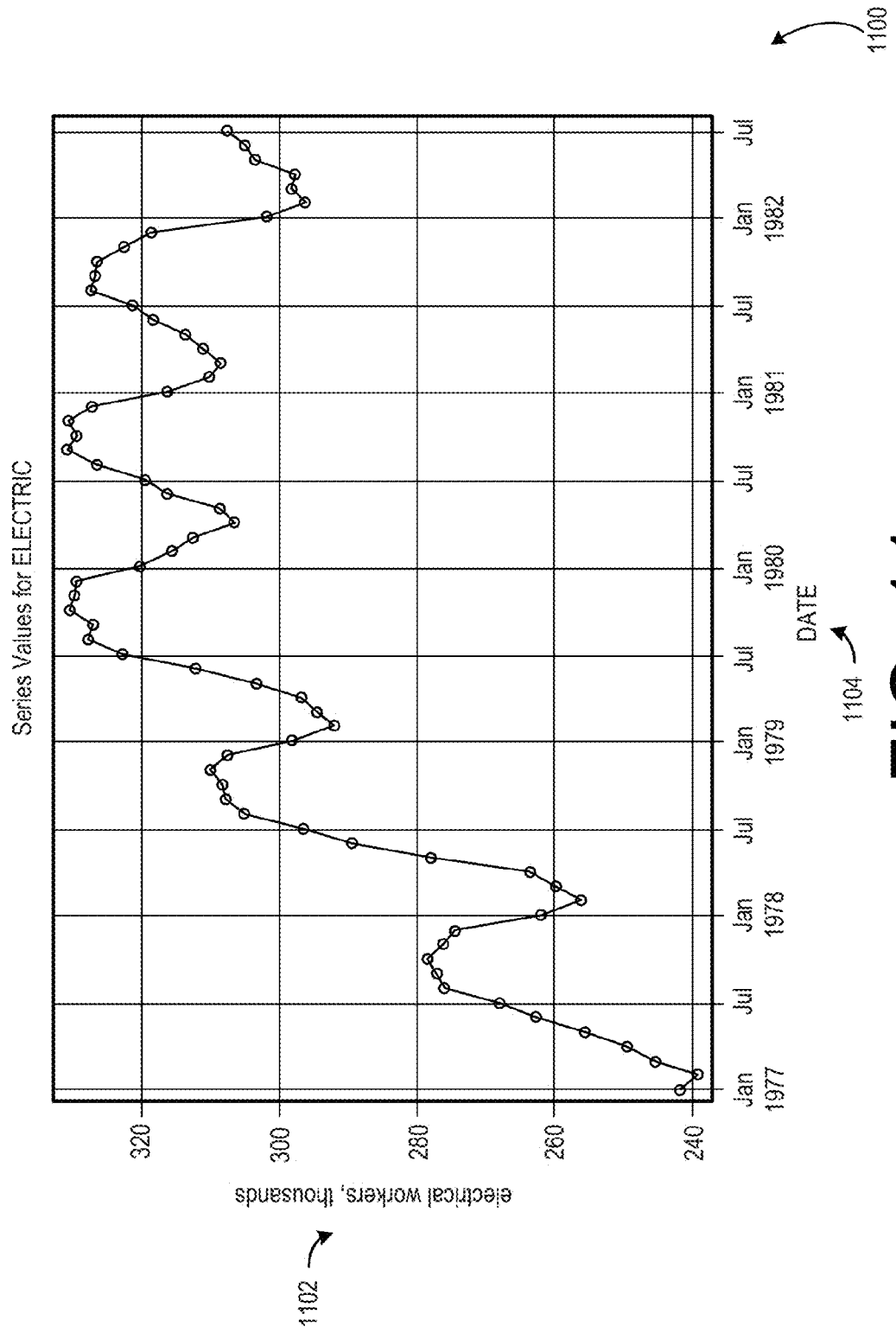
FIG. 11 illustrates an example of a continuous-valued time series data set, in accordance with at least one embodiment.

FIG. 11 illustrates an example continuous-valued time series data set 1100. In accordance with at least one embodiment, the continuous-valued time series data set 1100 includes data points corresponding to a number (in units of a thousand) of electrical workers (y-axis 1102) for a given date (x-axis 1104). In this example, continuous time series data set 1100 does not include zero values. Such a data set is best analyzed using an ARIMA, UCM, or ESM technique, for example, as the continuous nature of the data set best matches the assumptions of such algorithms for a continuous data set.

Figure 12:
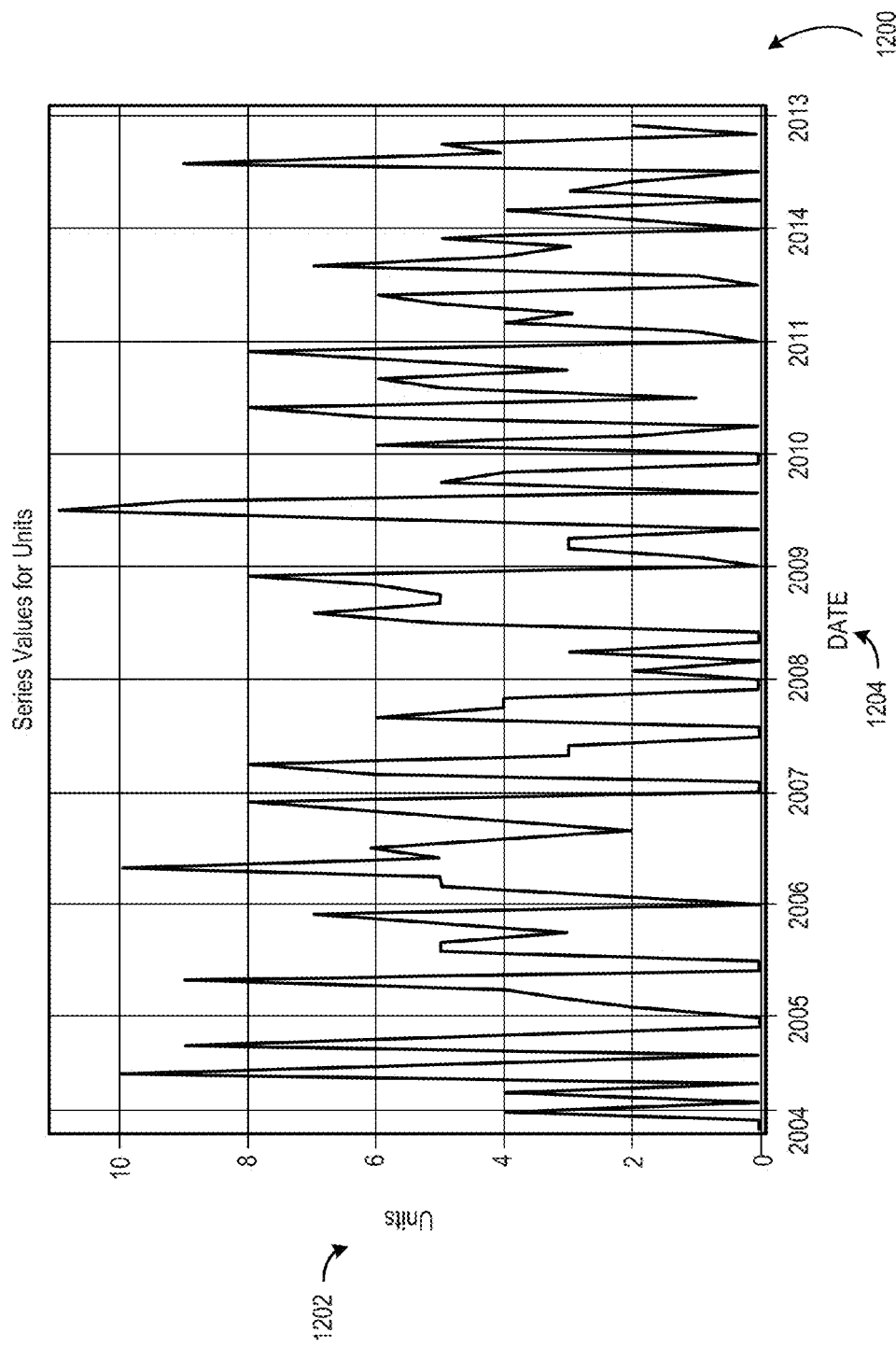
FIG. 12 illustrates an example count series data set, in accordance with at least one embodiment.

FIG. 12 illustrates an example count series data set 1200, in accordance with at least one embodiment. The count series data set may include a plurality of data points that have relatively low discrete values (e.g., 11 and under, whole numbers). In a non-limiting example, count series data set 1200 may represent a number of automobile parts in stock at various times of the year between the years of late 2003 to late 2014. The count series data set 1200, in this example, may be utilized to determine quantities of various automobile parts to stock at various times of the year. It should be understood that this is merely an example and other inventory or non-inventory examples may be substituted in the examples included herein. As a further example, the count series data set 1200 may represent a number of emergency room visits by medical condition at a given hospital (or number of hospitals). The count series data set 1200, in this case, may be utilized to determine an appropriate staffing schedule for medical personnel of the hospital(s). In yet a further example, the count series data set 1200 may represent a number of new venereal disease diagnoses for a given postal code (or a number of postal codes). In this example, the count series data set 1200 may be utilized to determine a number of predicted future instances of venereal disease diagnoses for the given postal code(s). In the example illustrated in FIG. 12, the count series data set 1200 is depicted in a graph with "units" on a y-axis 1202 and "date" on a x-axis 1204. In this example, there are several (e.g., 23) instances of zero values included in the count series data set 1200.

Figure 13:
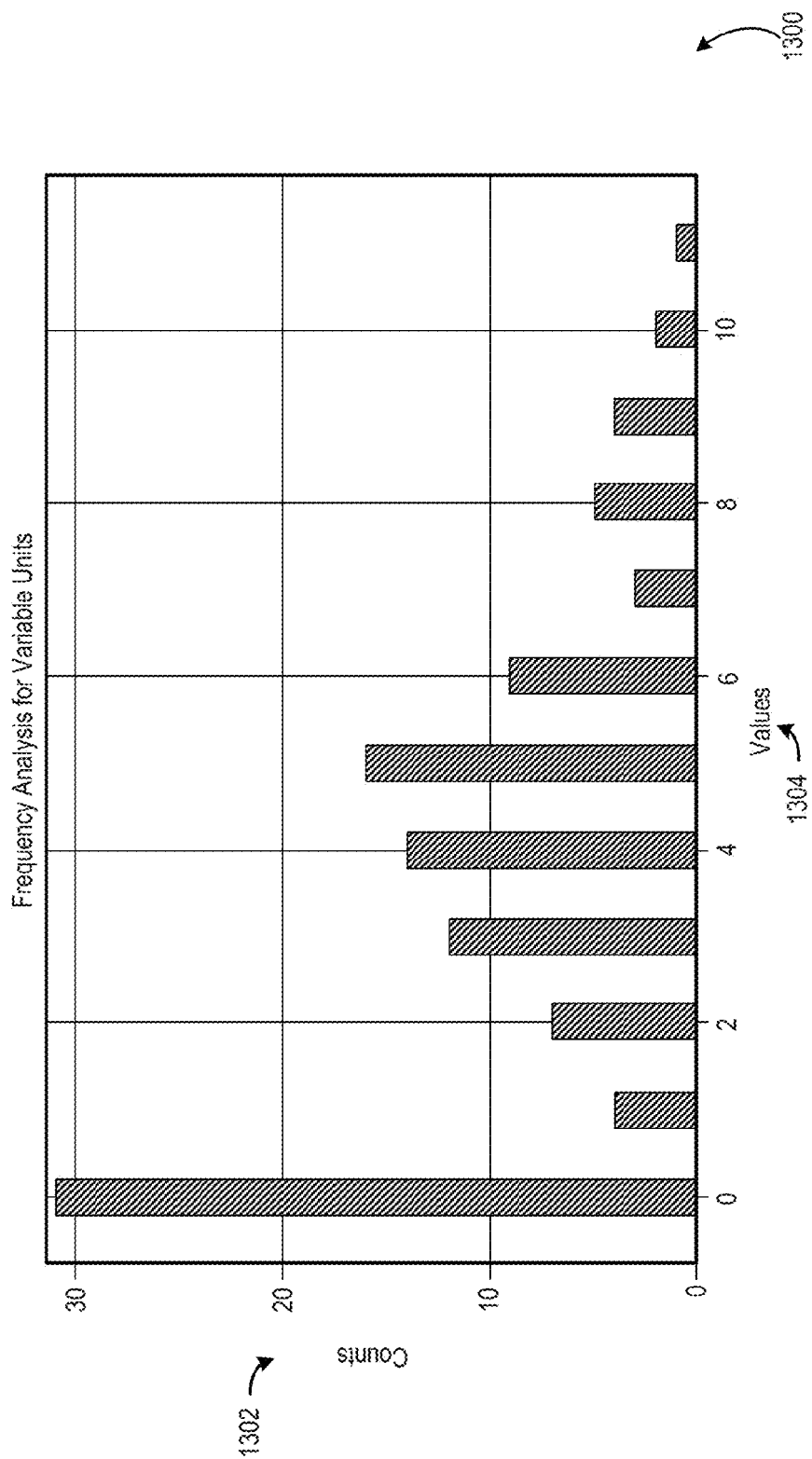
FIG. 13 illustrates an example graph representing an example count series frequency analysis, in accordance with at least one embodiment.

FIG. 13 illustrates an example graph 1300 representing an example count series frequency analysis of a count series data set (e.g., the count series data set of FIG. 12), in accordance with at least one embodiment. Graph 1300 depicts a count number (e.g., a number of occurrences) on an y-axis 1302 and values for the data points of the count series data set on the x-axis 1304. For example, according to graph 1300, the count series data set had 31 occurrences of a 0 value, 3 occurrences of a value of 1, 7 occurrences of a value of 2, 12 occurrences of a value of 3, 14 occurrences of a value of 4, 16 occurrences of a value of 5, 9 occurrences of a value of 6, 3 occurrences of a value of 7, 5 occurrences of a value of 8, 4 occurrences of a value of 9, 2 occurrences of a value of 10, and 1 occurrence of a value of 11.

Figure 14:
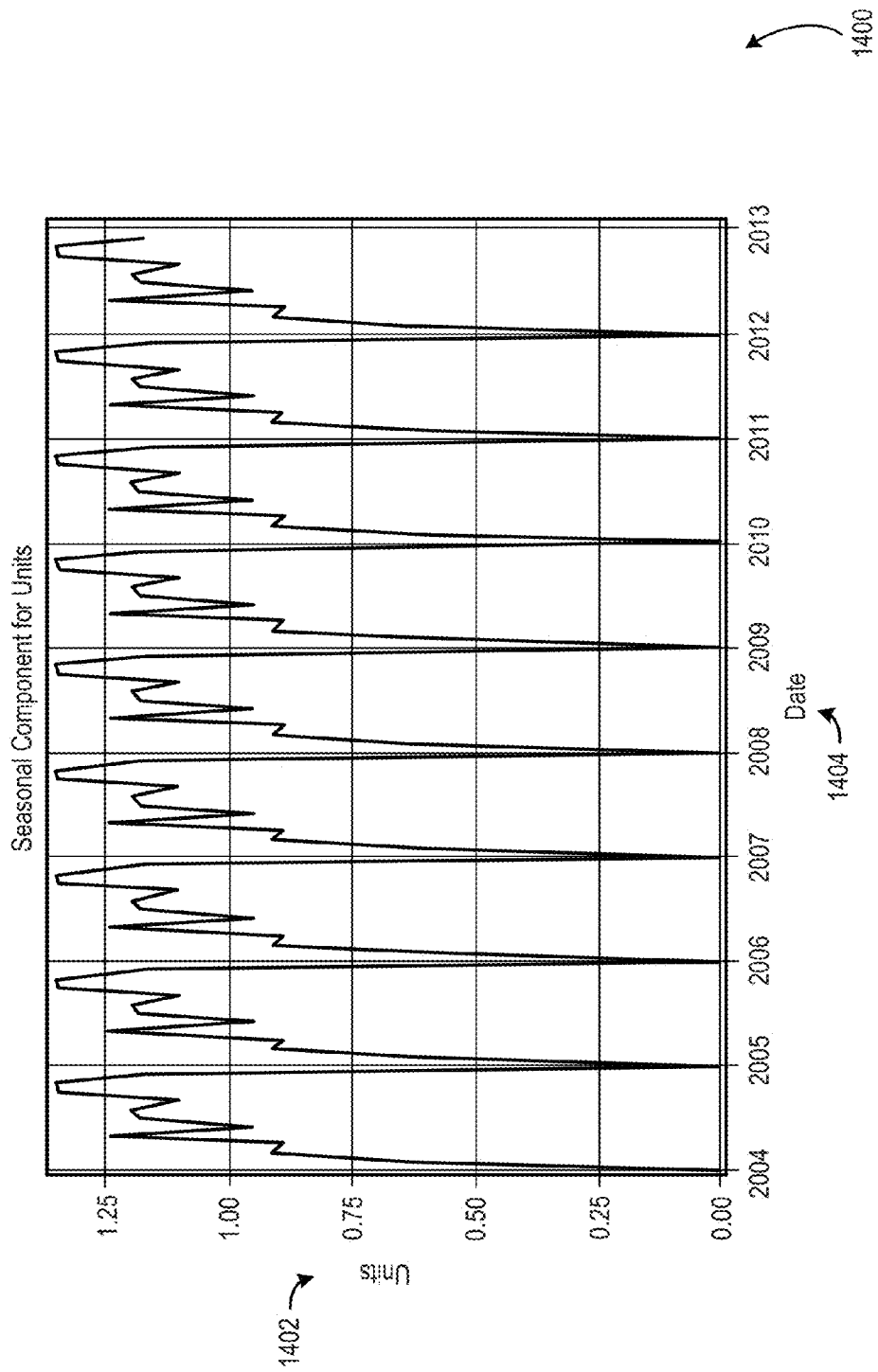
FIG. 14 illustrates an example graph representing a seasonal component of a count series data set, in accordance with at least one embodiment

FIG. 14 illustrates an example graph 1400 representing a seasonal component of a count series data set (e.g., the count series data set of FIG. 12), in accordance with at least one embodiment. A seasonal component of a count series is intended to refer to a part of the variations in a count series attributable to intra-year fluctuations that are substantially stable year after year with respect to timing, direction, and magnitude. It should be appreciated that intra-year fluctuations is just one possible cycle, and that other cycles are possible (e.g., intra-day). Thus, the seasonal component may reflect variations that recur every year, for example, to the same extent as the previous year. Graph 1400 illustrates such a seasonal component. For example, graph 1400 represents a unit number (e.g., a number of items in inventory of a particular product) on a y-axis 1402 and date values on the x-axis 1404. A pattern may emerge indicating a seasonal component for the count series data set of FIG. 12 indicating, for example, three peaks in inventory throughout each (or at least one) year.

Figure 15:
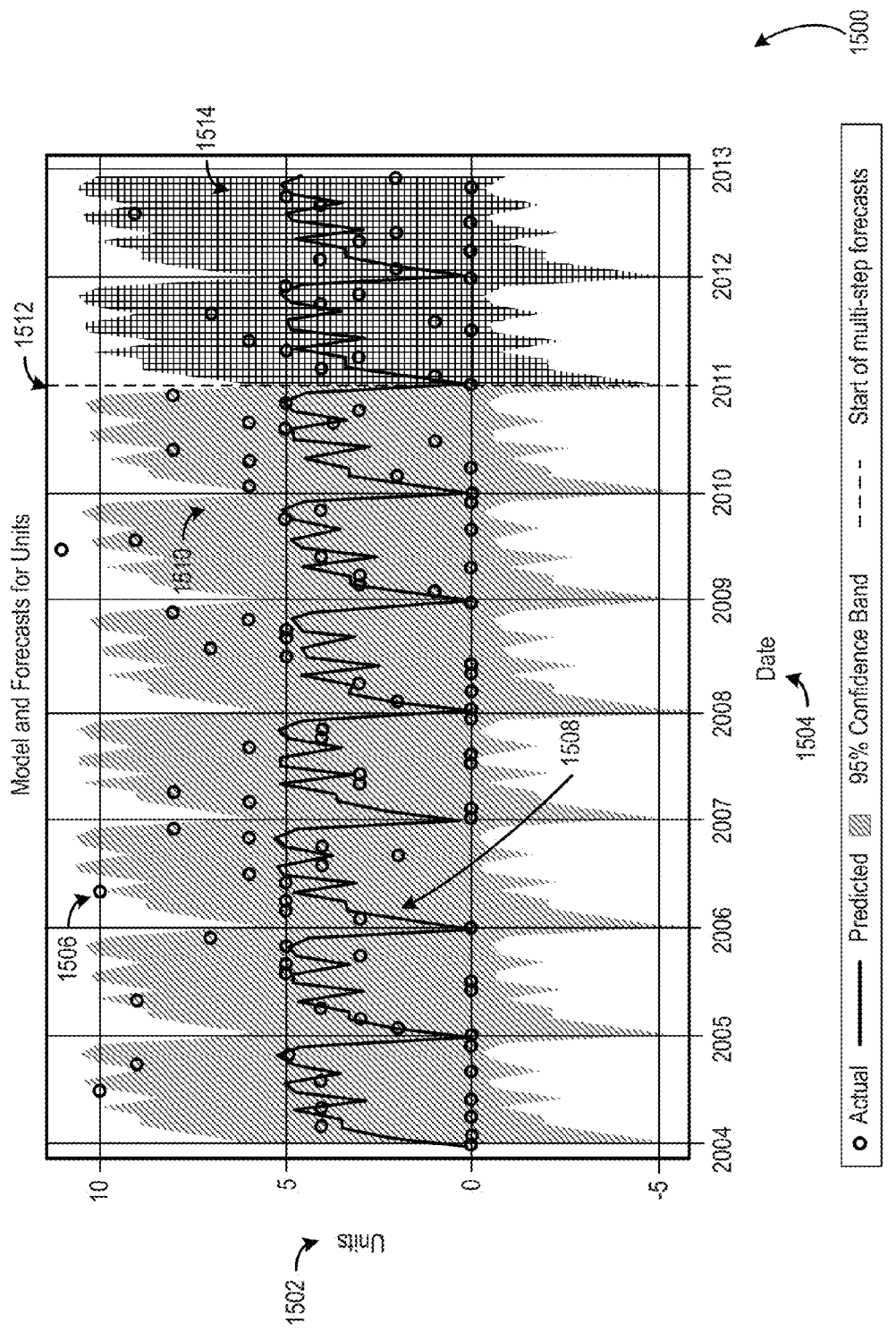
FIG. 15 illustrates an example count series forecast using current forecasting techniques.

FIG. 15 illustrates an example count series forecast using current forecasting techniques. Using the count series data set of FIG. 12, a forecast is generated using a traditional seasonal exponential smoothing model. Y-axis 1502 depicts the units (e.g., of an item) and the x-axis depicts a date (e.g., years 2004-2013). Actual data points are depicted by circles, such as circle 1506. Forecasted values are depicted with the solid line 1508. A confidence band (e.g., 95% confidence band) is depicted with the confidence region 1510. Dotted line 1512 depicts the start of a multi-step process as depicted from the graph elements occurring to the right of the dotted line 1512. In other words, dotted line 1512 separates the in-sample and out-sample region. It should be appreciated that the forecast illustrated in FIG. 15 depicts a seasonally varying count series with zero (value) inflation. The confidence region 1510 and confidence region 1514 each extend to negative values. For a count series data set, a negative value is unrealistic. For example, in an inventory use case, one could not have negative 2 automobile brake pads. Thus, FIG. 15 illustrates the difficulty of most traditional time series techniques in forecasting count series due to the discrete and the zero-modified nature of the data set (e.g., high occurrences of zeros relative to other values in the data set).

Figure 16:
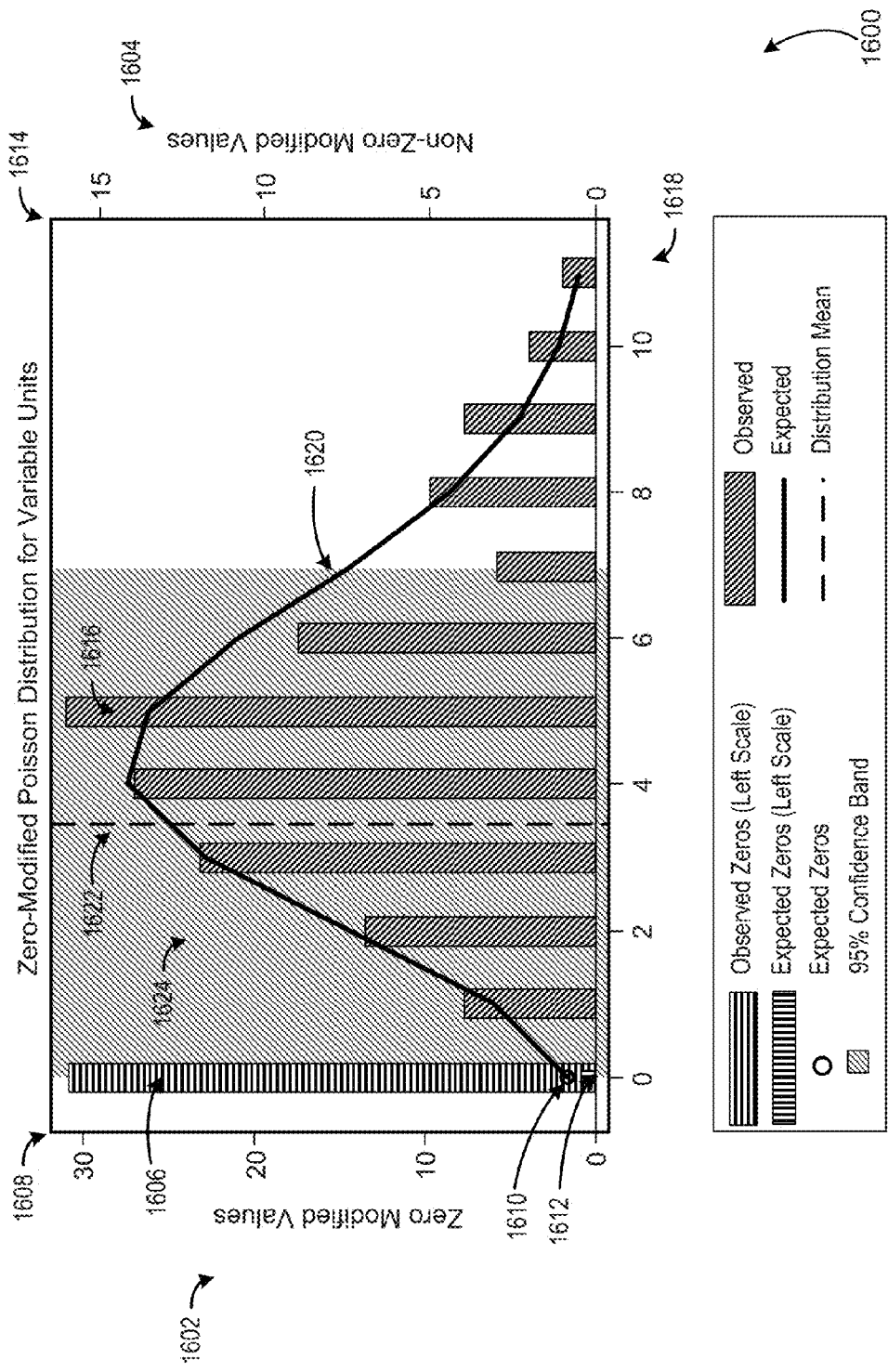
FIG. 16 illustrates an example graph of a zero-modified Poisson probability distribution for variable units, in accordance with at least one embodiment.

FIG. 16 illustrates an example graph 1600 of a zero-modified Poisson probability distribution for variable units, in accordance with at least one embodiment. Graph 1600 utilizes a y-axis 1602 and a y-axis 1604. For example, y-axis 1602 corresponds to the observed zeros as indicated by observed zeros bar 1606. In some examples, the corresponding scale range of the y-axis 1602 and the y-axis 1604 may differ. For example, y-axis 1602 may represent a number of zero modified values of the data set. Scale range 1608 may be determined based on the number of zero-modified values in the data set. Continuing on with the example of FIG. 12, scale range 1608 may be adjusted to allow for the zero occurrences (e.g., 31 occurrences) to be optimally displayed. Scale range 1608 may also correspond to a number of expected zeros depicted by circle 1610 (based on scale range 1614) and a number of expected zeros depicted by bar 1612 (based on scale range 1608).

Scale range 1608 may differ from scale range 1614. For example, scale range 1608 may range from 0 to 32 and correspond to the zero values of the data set, while scale range 1614 may range from 0 to 17 and correspond to the non-zero values of the data set. Scale range 1614, in some examples, may depict a number of non-zero modified values and correspond to the depicted observed bars (e.g., observed bar 1616). Observed bars (e.g., the observed bar 1616) may be associated with particular values as depicted by x-axis 1618. X-axis 1618 may utilize a same, or different, scale range as y-axis 1604 or y-axis 1602.

Additionally, or alternatively, an expected line 1620 may be utilized to depict estimated discrete probability distribution values. Expected line 1620 may utilize the scale range associated with the x-axis 1618. Dashed vertical line 1622 may indicate the distribution mean and may utilize the scale range associated with the x-axis 1618. Similarly, the confidence band (e.g., a 95% confidence band) may be depicted by shaded area 1624. Shaded area 1624 may utilize the scale range associated with the x-axis 1618. Utilizing the graph 1600, a variety of data having difference scales of measurement may be displayed in an optimal manner, so that such information is visible at a glance.

Figure 17:
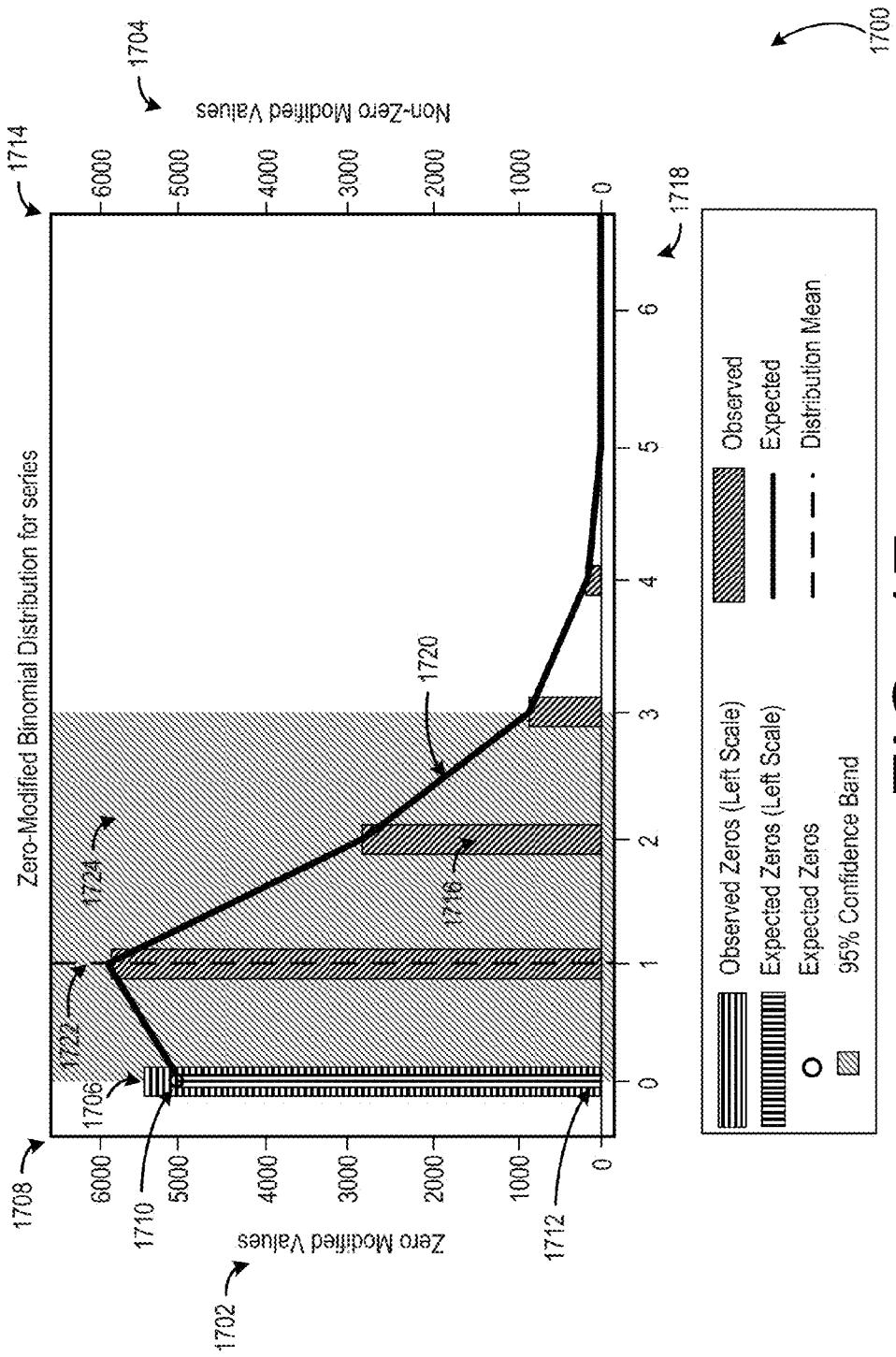
FIG. 17 illustrates an additional example graph of a zero-modified Binomial Distribution for Series, in accordance with at least one embodiment.

FIG. 17 illustrates an example graph 1700 of a zero-modified binomial distribution for series, in accordance with at least one embodiment. Graph 1700 utilizes a y-axis 1702 and a y-axis 1704. For example, y-axis 1702 corresponds to the observed zeros as indicated by observed zeros bar 1706. In this example, the corresponding scale ranges of the y-axis 1702 and the y-axis 1704 are the same. For example, y-axis 1702 may represent a number of zero modified values of the data set. Scale range 1708 may be determined based on the number of zero-modified values in the data set. Scale range 1708 may be adjusted to allow for the zero occurrences to be optimally displayed. Scale range 1708 may also correspond to a number of expected zeros depicted by circle 1710 (based on scale range 1714) and a number of expected zeros depicted by bar 1712 (based on scale range 1708).

Scale range 1714, in some examples, may depict a number of non-zero modified values and correspond to the depicted observed bars (e.g., observed bar 1716). Observed bars (e.g., the observed bar 1716) may be associated with particular values as depicted by x-axis 1718. X-axis 1718 may utilize a same, or different, scale range as y-axis 1704 or y-axis 1702.

Additionally, or alternatively, an expected line 1720 may be utilized to depict estimated discrete probability distribution values. Expected line 1720 may utilize the scale range associated with the x-axis 1618. Dashed vertical line 1722 may indicate the distribution mean and may utilize the scale range associated with the x-axis 1718. Similarly, the confidence band (e.g., a 95% confidence band) may be depicted by shaded area 1724. Shaded area 1724 may utilize the scale range associated with the x-axis 1718. Utilizing the graph 1700, a variety of data having difference scales of measurement may be displayed in an optimal manner, so that such information is visible at a glance.

Figure 18:
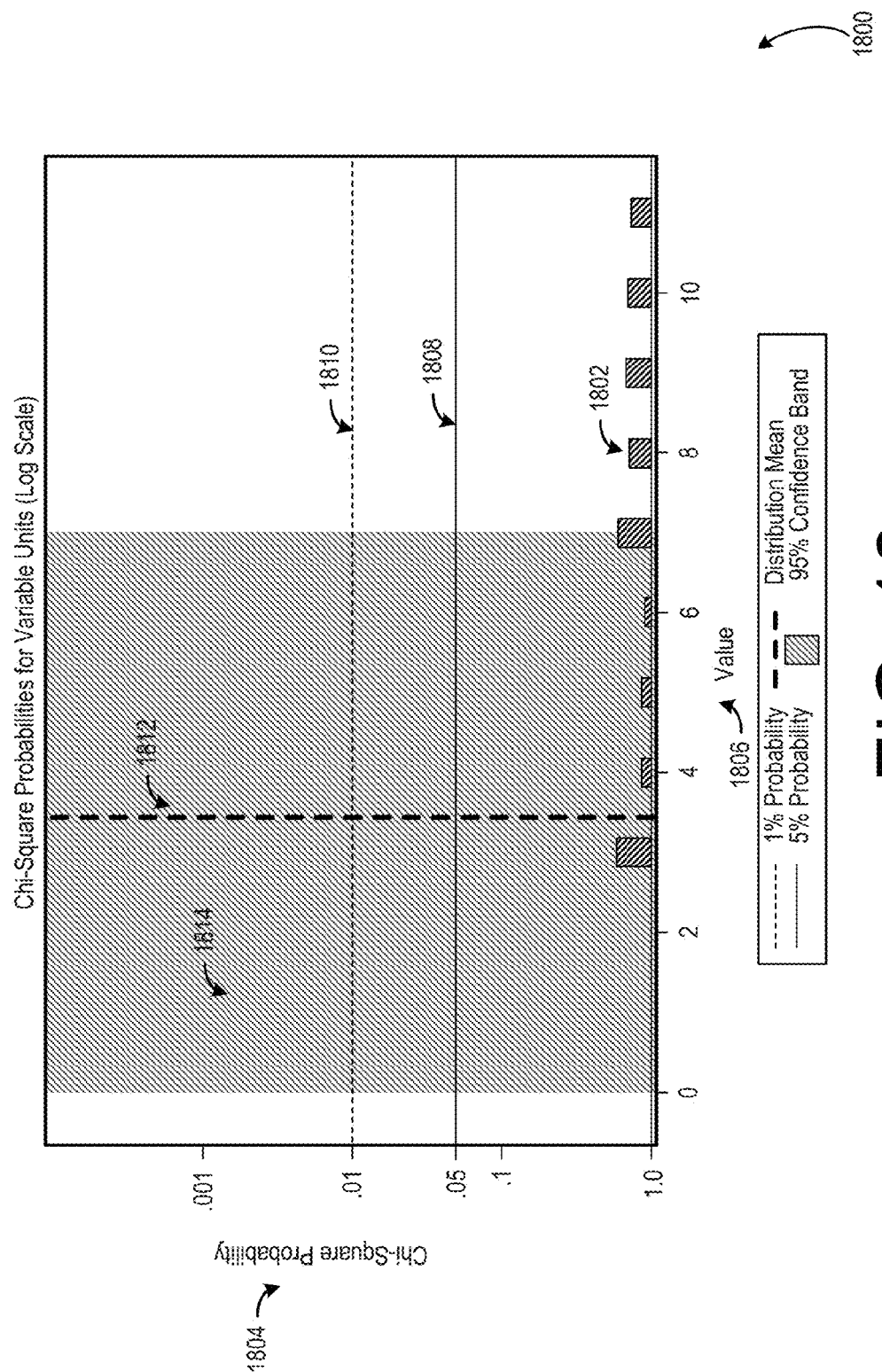
FIG. 18 illustrates an example chi-square probability chart, in accordance with at least one embodiment.

FIG. 18 illustrates an example chi-square probability chart 1800. Continuing with the example of FIG. 16, chi-square probability chart 1800 illustrates a chi-square probabilities (on a log scale) of the selected distribution (ZERO-MODIFIED POISSON). The bars (e.g., bar 1802) represent the probability (y-axis 1804) of observing as many, or more, of a given value (x-axis 1806) under the estimated chi-square distribution. The horizontal line 1808 and the horizontal line 1810 represent standard significance thresholds of 0.05 and 0.01, respectively. The dashed vertical line 1812 represents the distribution mean, and shading 1814 represents a confidence region (e.g., a 95% confidence region). The chi-square probability chart 1800 suggests that the zero-modified Poisson distribution fits the data reasonably well, as all of the bars are below the thresholds (e.g., depicted by the horizontal line 1808 and the horizontal line 1810). Utilizing the chi-square probability chart 1800, a user may quickly assess the quality/fit of the predictive model to a particular data set. In at least one case, probabilities occurring above either horizontal line 1808 or horizontal line 1810 may indicate that the predictive model is in inaccurate and may need to be re-fit. It should be understood that standard significance thresholds of any value may be used, 0.05 and 0.01 are used for illustration only. Additionally, any number of significance thresholds may be utilized. For simplicity, this example utilizes only two.

Figure 19:
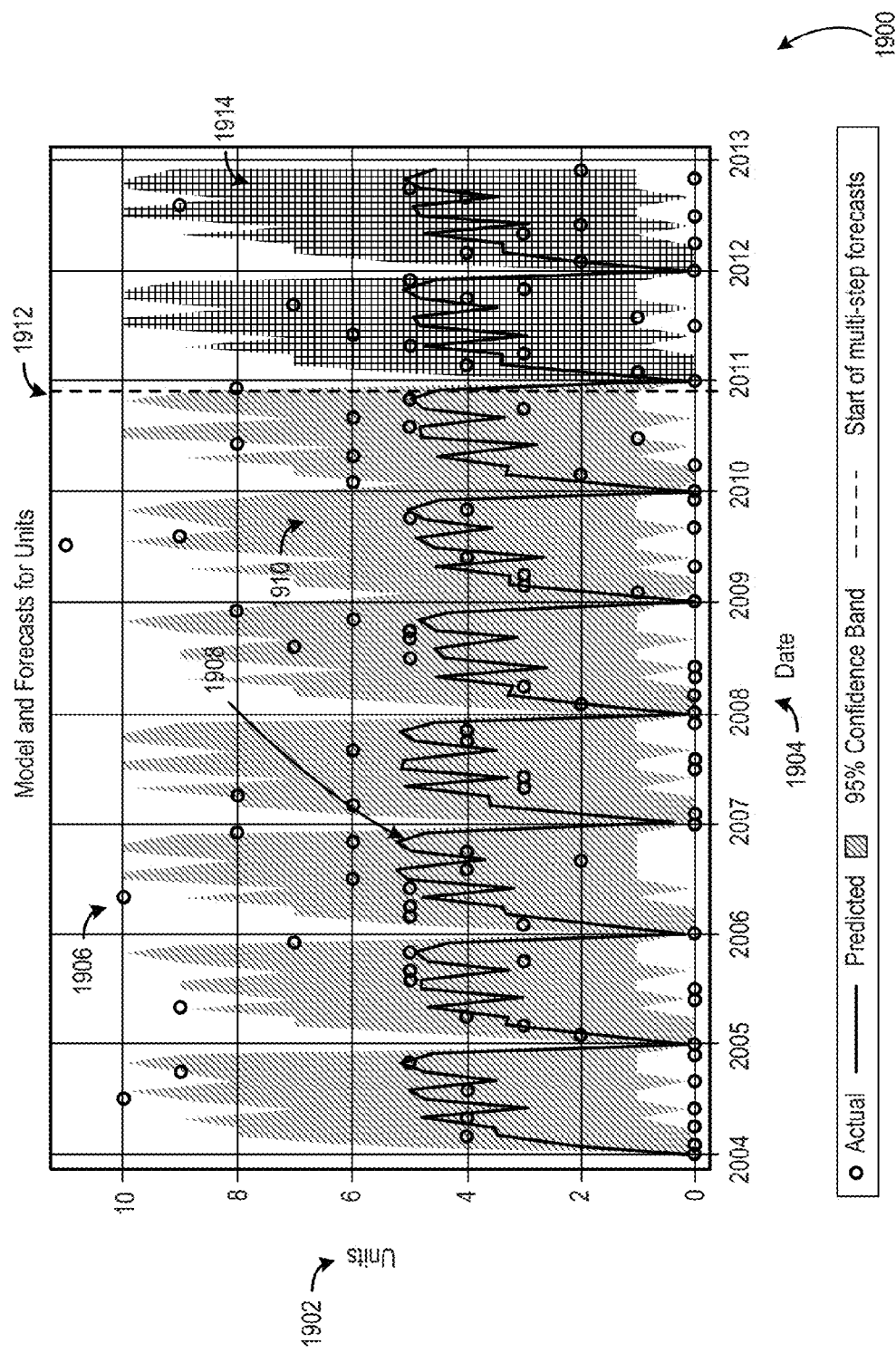
FIG. 19 illustrates an example graph of an adjusted forecast, in accordance with at least one embodiment.

FIG. 19 illustrates an example graph 1900 of an adjusted forecast in accordance with the count series forecasting techniques disclosed herein. Graph 1900 may be generated using the data set of FIG. 12 and the count series forecasting techniques discussed above in connection with FIGS. 16 and 18. Y-axis 1902 may depict units (e.g., a number of items) and the x-axis 1904 may depict a date (e.g., years 2004-2013). Actual data points may be depicted by circles, such as circle 1906. Any geometric shape or indicator may be utilized in a similar manner. Forecasted values may be depicted with solid line 1908. A confidence band (e.g., a 95% confidence band) may be depicted utilizing confidence region 1910. Dotted line 1912 may separate the in-sample and out-sample region. It should be appreciated that the forecast illustrated in FIG. 19 depicts a seasonally varying count series with zero (value) inflation. The confidence region 1910 and confidence region 1914 each represent only positive numbers. Compared to the forecast of FIG. 15, FIG. 19 presents more realistic forecast information. For example, the units of the forecast of FIG. 19 are all non-negative values. Additionally, the confidence values of FIG. 15 are not integer-valued, while the confidence regions in FIG. 19 are non-negative and integer-valued, and the confidence region 1910 and the confidence region 1914 are narrower than the confidence region 1510 and the confidence region 1514 of FIG. 15. Thus, the forecast of FIG. 19 provides a more accurate forecast for the count series data set than the forecast of FIG. 15.

Figure 20:
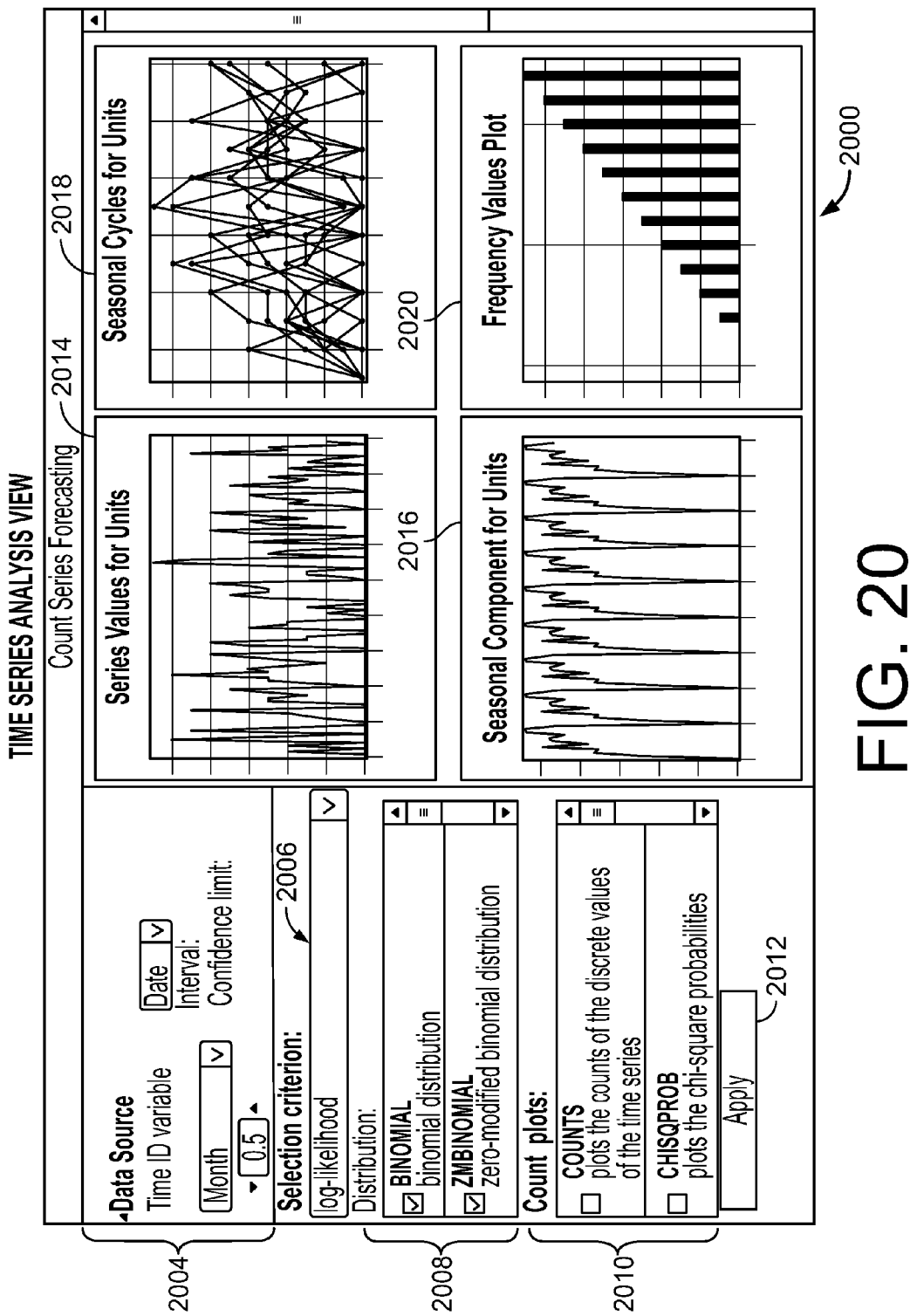
FIG. 20-22 illustrate an example graphical interface for count series forecasting, in accordance with at least one embodiment.
Figure 21:
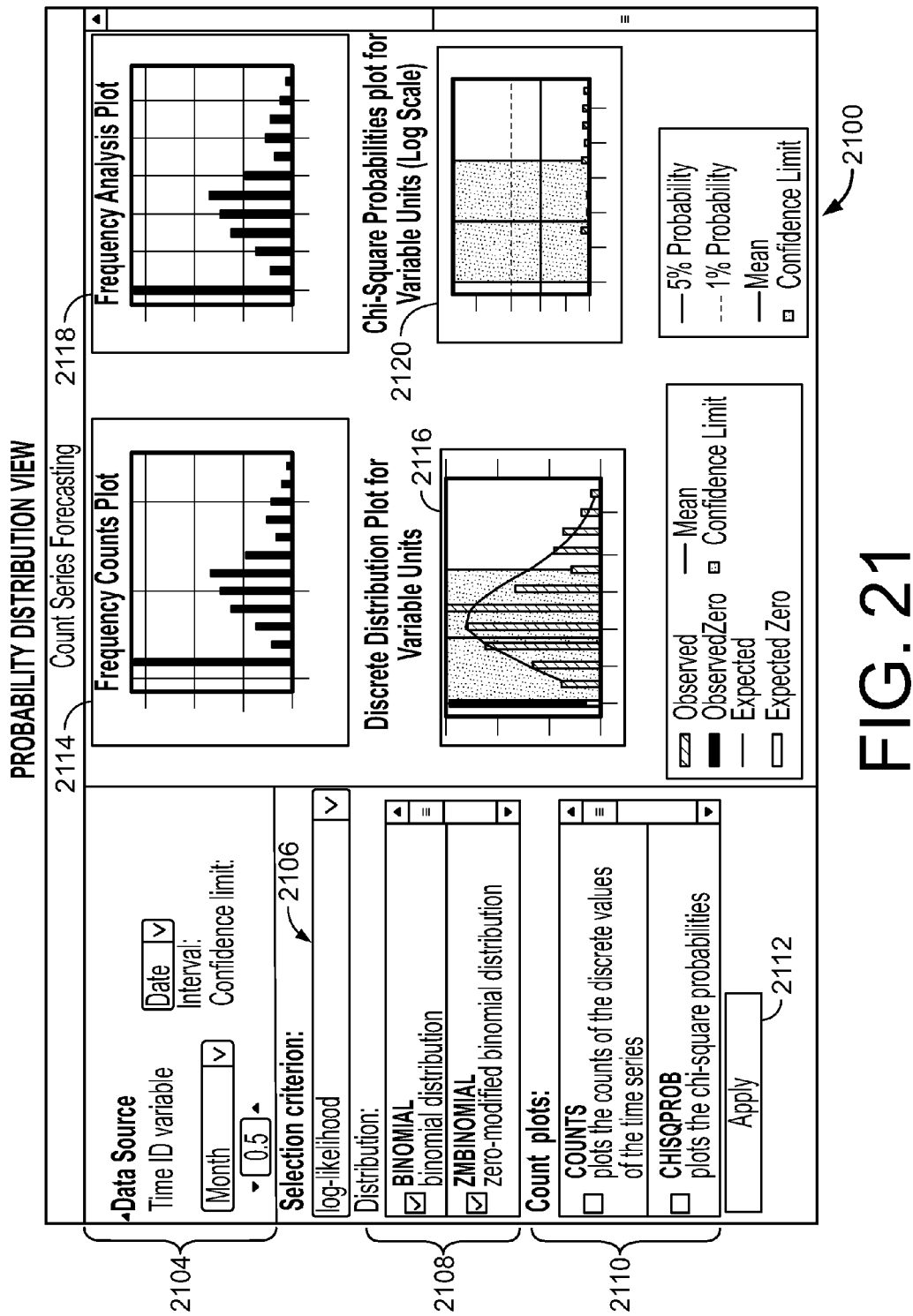
Figure 22:
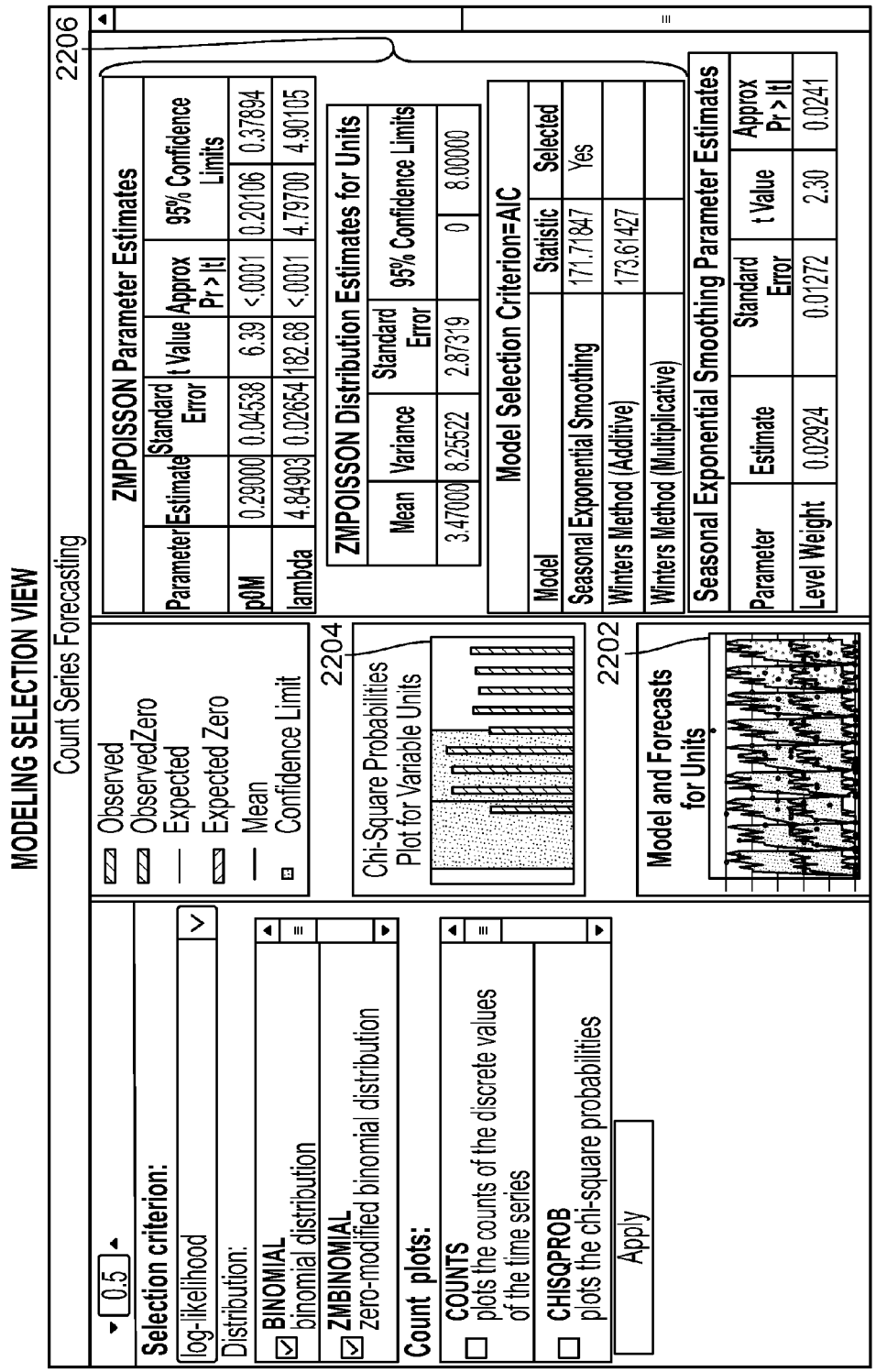

FIG. 20-22 illustrate example user interfaces for count series forecasting. In at least one embodiment, a user interface 2000, 2100, and/or 2200 may be provided to analyze and model count series for forecasting and monitoring. In at least one example, user input (e.g., a data specification) may be provided (e.g., by a user, or from a computing device separate from the count series forecasting engine 122 of FIG. 1. A data specification may include a combination or the following: a data set name; group-by variable information indicating a number of classification variables; time identification information including, but not limited to, a variable name, a time interval, and/or a seasonality; a number of dependent variables (e.g., target variable or variable to forecast); a number of independent variables (e.g., input variable or predictor variable); a number of adjustment variables (e.g., systematic variables).

In at least one example, the user interface 2000 may be utilized to present a time series analysis view of the data set. The user interface 2000 may in some implementations provide diagnostic tools to help identify model components that might help improve the accuracy of the forecast(s). Using user interface 2000, a user can choose one or more time series plots and tables to utilize when displaying information of a selected time series or for results of a computer-generated analysis.

In at least one example, any suitable number of data specification parameters may be provided (e.g., by default or by user action) via pane 2004. A selection criteria (e.g., Akaike's information criterion (AIC), a Bayesian information criterion (BIC), log-likelihood criterion (LOGLIK), etc.) may be selected using drop down menu 2006. One or more discrete distribution types may be selected, for example, using selection menu 2008. A number of count plot types may be selected via pane 2010 (e.g., utilizing provided checkboxes). Upon making various selections, the user may select the "apply" button 2012 in order to see the analysis plots selected.

In at least one embodiment, the following graphs appear in the time series analysis view by default (e.g., subsequent to performing a time series analysis and residual analysis): a current time series plot (e.g., the current time series plot 2014, in this example, corresponding to count series data set 1200 of FIG. 12); a plot of the seasonal decomposition (e.g., the seasonal decomposition plot 2016, in this example, corresponding to graph 1400 of FIG. 14); a plot in in the log scale of the white noise probability test for a dependent series variable; plot(s) of the autocorrelation function, partial autocorrelation function, inverse autocorrelation function, and white noise probability test. It should be appreciated that not all such plots are shown in FIG. 14.

In the current example, user interface 2000 may present the user, in addition to current time series plot 2014 and seasonal decomposition plot 2016 as well as seasonal cycles for unit plot 2018, the frequency values plot 2020.

In at least one example, the user interface 2100 of FIG. 21 may be utilized to present a probability distribution view of a data set. A probability distribution view, as depicted in FIG. 21, may provide a user the ability to identify a discrete probability distribution that might help improve the accuracy of a forecast. In at least one example, any number of data specification parameters may be provided (e.g., by default or by user action) via pane 2104. A selection criteria (e.g., AIC, log-likelihood, etc.) may be selected using drop down menu 2106. One or more discrete distribution types may be selected, for example, using selection menu 2108. A number of count plot types may be selected via pane 2110 (e.g., utilizing checkboxes). Upon making various selections, the user may select the "apply" button 2112 in order to see the various probability distribution associated with the data.

In at least one example, types of distribution types that are selectable by the user via selection menu 2108 may include, but are not limited to, a binomial probability distribution, a zero-modified negative binomial distribution, a zero-modified binomial probability distribution, a geometric probability distribution, a zero-modified geometric probability distribution, a Poisson probability distribution, a zero-modified Poisson probability distribution, a negative binomial probability distribution, and the like. A user may select one or more of these types of distributions to be viewed via the user interface 2100. If the user selects more than one type of distribution, the user may specify a discrete probability distribution selection criteria (e.g., via drop down menu 2106). In at least one example, selection criteria may include, but are not limited to, an AIC criterion, a BIC criterion, or a log-likelihood criterion. In at least one example, a default criterion may be set to the log-likelihood criterion selection.

In at least one example, by default, the following tables and graphs appear in the Probability Distribution View: A frequency analysis plot (e.g., plot 2114) including rectangular bars that represent the non-zero count series values; A sample count statistics table (e.g., plot 2118) depicting sample statistics describe the count series data; An automatic distribution selection table that describes how the selected distribution was chosen using a distribution section criterion; A selected distribution parameter estimates table where a parameter $P_0^M$ (the zero-modification (percentage)) and the other parameters determine the shape of the distribution; A distribution estimates table including estimates based on the parameter estimates table; A selected discrete probability distribution plot (e.g., the plot 2116, in this example, corresponding to FIG. 23). In at least one example, the plot 2116 includes non-zero count series values, zero count series values (on a different scale), estimated discrete probability distribution values, a zero-modified distribution, a mean estimate, a confidence region for the distribution mean; a Chi-square probabilities (on a log scale) of the selected distribution (e.g., plot 2120, in this example, corresponding for FIG. 18) including the probabilities, horizontal line(s) representing standard significance thresholds, a vertical line representing the distribution mean, and a shading representing the confidence region (e.g., a 95% confidence region).

In at least one example, the user interface 2200 of FIG. 22 may be utilized to present a model selection list or the selected series. A user can also use plots and tables to compare how different models fit the data.

In accordance with at least one embodiment, a user may be presented with the name of the selected count series data set, a dependent variable for the project, and the statistics of fit for the count series. If a user has specified an out-of-sample range, then the user may view information about the statistics of fit. The model selection list shows that the models that have been fitted to a count series. In some examples, for each model, the list may display the model name, the model type, whether the model is read-only, and the fit criterion for the model. The model selection list may also display when a model has been rejected.

In at least one example, a time series analysis may be performed, including but not limited to, a seasonal decomposition, a correlation analysis, and a spectral analysis as well as a residual analysis for the model. As a result, the following tables and graphs may appear in the Modeling Selection View: A plot 2202 (in this example, corresponding to graph 1900 of FIG. 19) that includes the generated forecasts in the forecast horizon; a plot of the residuals for the predicted errors (e.g., differences between actual values in the count series data set and forecasted values); and a plot in the log scale of the white noise probability test for predicted error. In the example depicted in FIG. 22, a Chi-Square Probabilities plot (in this example, similar in nature to the chi-square probability chart 1800 of FIG. 18) may be visible. Additionally, or alternatively, tables 2206 (in this example, corresponding to a table 2600A, 2600B, and 2600C of FIGS. 26A-26C). Additional tables discussed above may be included in the modeling selection view using user interface 2200.

Figure 23:
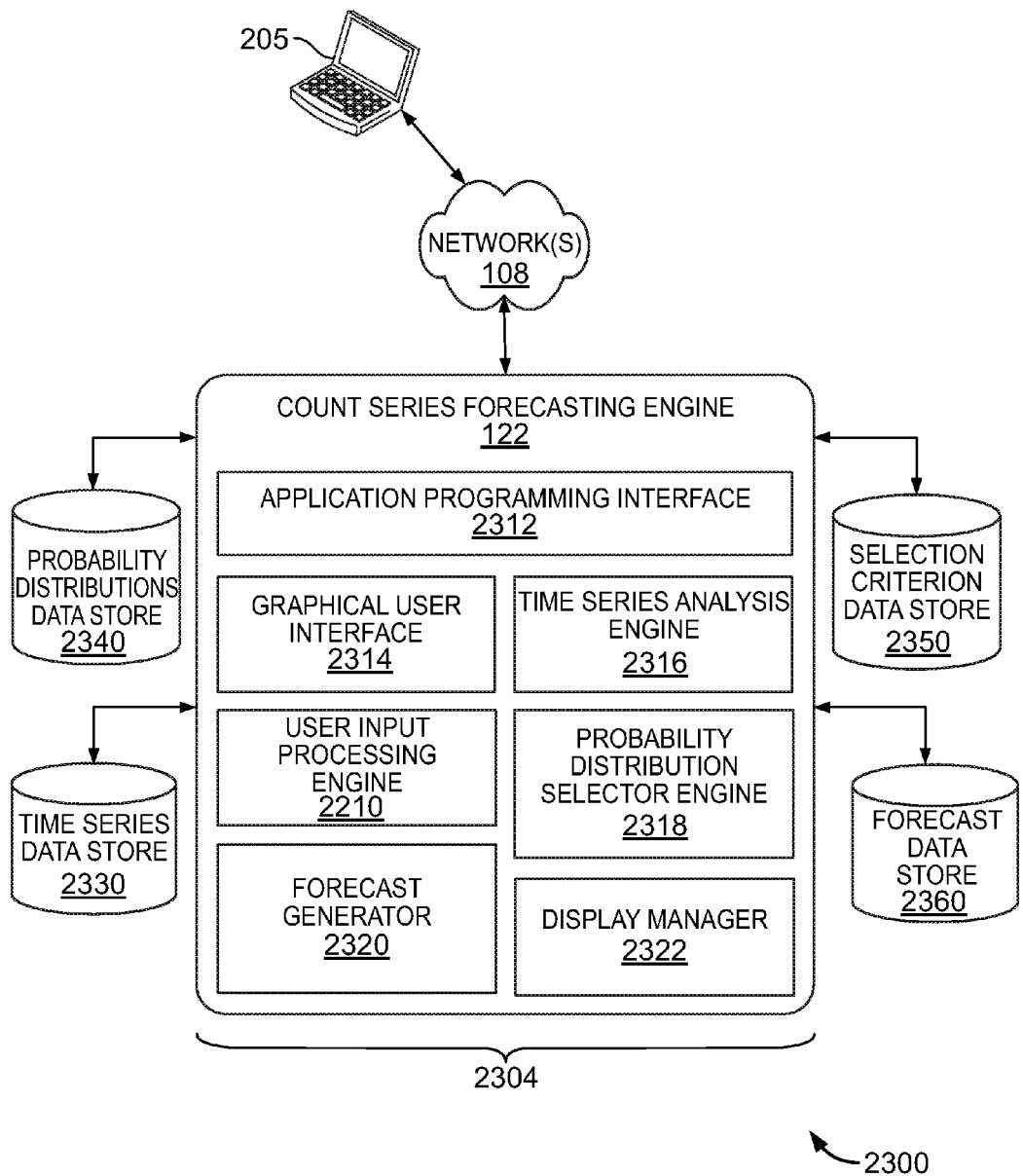
FIG. 23 illustrates an example computer architecture 900 for a count series forecasting engine, in accordance with at least one embodiment.

FIG. 23 illustrates an example computer architecture 2300 for a count series forecasting engine 122 of FIG. 1. In some examples, the computer architecture 2300 may be implemented on an edge device (e.g., the edge device described above). The computer architecture 2300 may include a plurality of components 2304 that may carry out various embodiments. If the components 2304 are software modules, the components 2304 can be embodied on a computer readable medium and processed by a processor in any of the computer systems described herein. It should be noted that any module or data store described herein, may be, in some embodiments, a service responsible for managing data of the type required to make corresponding calculations. The components 2304 may be configured in the manner suggested in FIG. 23 or the components 2304 may exist as separate modules or services external to the count series forecasting engine 122.

In the embodiment shown in the drawings, a time series data store 2330, a probability distributions data store 2340, a selection criterion data store 2350, and a forecast data store 2360 are shown, although data can be maintained, derived, or otherwise accessed from various data stores, either remotely or locally, to achieve the functions described herein. The count series forecasting engine 122, as shown in FIG. 23, includes various modules such as a graphical user interface 2314, an application programming interface 2312, a user input processing engine 2310, time series analysis engine 2316, a probability distribution selector engine 2318, a forecast generator 2320, and a display manager 2322. Some functions of components 2310, 2314, 2316, 2318, 2320, and 2322 are described below. However, for the benefit of the reader, a brief, non-limiting description of each of the modules is provided in the following paragraphs.

In accordance with at least one embodiment, a process is enabled for utilizing the count series forecasting engine 122. For example, a user may utilize a user device 2302 (e.g., the network device(s) 204-209 of FIG. 2) to interact with the count series forecasting engine 122 (e.g., via user interface 2000, 2100, and 2200 discussed below with respect to FIGS. 20, 21, and 22, respectively). User device 2302 may be configured to communicate with networks 2308 (e.g., the network(s) 108 of FIG. 1). As part of a count series analysis process, or at any suitable time, user input may be received by user input processing engine 2310 via graphical user interface 2314 and application programming interface 2312, each being a component of the count series forecasting engine 122. As a side, the graphical user interface 2314 and the application programming interface 2312 may be utilized in any suitable example described herein as a means for receiving and providing information by the count series forecasting engine 122.

In at least one example, a user may utilize the user interfaces described below in FIGS. 20-22 to provide user input (e.g., a user specification) related to time series analysis. For example, user input may specify at least one of a data set, one or more probability distributions, a selection criterion, a confidence threshold, or a statistical model.

Upon receipt, user input processing engine 2310 may cause time series analysis engine 2316 to analyze a time series using the user specification. For example, time series analysis engine may utilize the user specification to identify a data set from time series data store 2330, a data store responsible for storing time series data sets. The time series analysis engine 2316 may analyze the time series data set to provide a set of counts. The time series analysis engine 2316 may provide the set of counts and the user input to the probability distribution selector engine 2318. Alternative, the probability distribution selector engine 2318 may analyze the time series data set to provide the set of counts.

In at least one example, the probability distribution selector engine 2318 may utilize the user input to identify information corresponding to a number of probability distributions from the probability distributions data store 2340. The probability distribution selector engine 2318 may further identify a number of rules, formulas, and/or algorithms corresponding to a selection criterion (e.g., AIC, BIC, log-likelihood, or the like) from the selection criterion data store 2350. The probability distribution selector engine 2318 may utilize the information corresponding to the number of probability distributions and the selection criterion to determine an optimal probability distribution for the time series data set. Information related to the optimal probability distribution may be provided to the time series analysis engine 2316.

The time series analysis engine 2316 may cause the forecast generator 2320 to provide a forecast for the time series data set. In at least one example, the time series analysis engine 2316 may provide the time series data set and the user input to the forecast generator 2320. The forecast generator 2320 may utilize the user input to determine a number of statistical models with which to provide a forecast. In at least one example, the statistical models may be stored in forecast data store 2360, a data store responsible for storing such information. The forecast generator 2320 may utilize the user input to identify a number of rules, formulas, and/or algorithms corresponding to a selection criterion from the selection criterion data store 2350. The forecast generator 2320 may select a statistical model using the selection criterion. The forecast generator 2320 may generate a number of forecasts utilizing the statistical models. A forecast may be selected based on the selection criterion. In at least one example, the forecast generator 2320 may analyze the selected statistical model to determine a degree of accuracy related to the forecast generated using the selected statistical model.

In at least one embodiment, the time series analysis engine 2316 may receive or obtain the forecast generated and selected by the forecast generator 2320. The time series analysis engine 2316 may use information related to the probability distribution elected by the probability distribution selector engine 2318 to adjust the forecast selected by the forecast generator 2320. The time series analysis engine 2316 may provide the adjusted forecast to the display manager 2322, a component of the count series forecasting engine 122. The display manager 2322 produce may one or more graphs, or any suitable graphical element, to display information related to the probability distribution(s), forecast(s), or adjusted forecast. For example, the display manager 2322 may provide user interface 2000, 2100, and 2200 of FIGS. 20, 21, and 22, respectively.

Figure 24:
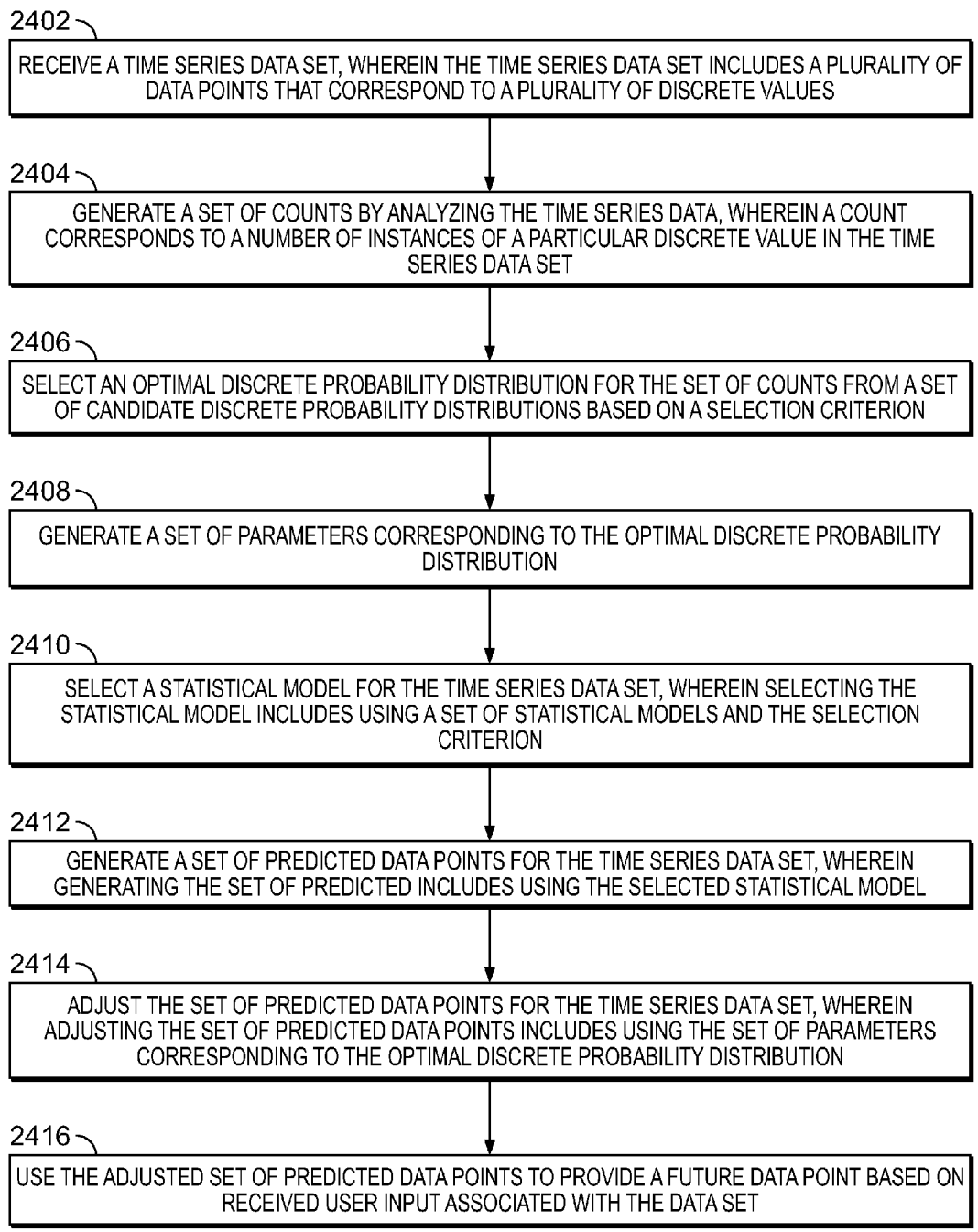
FIG. 24 illustrates an example flow chart depicting a method for count series forecasting, in accordance with at least one embodiment.

FIG. 24 illustrates an example flow chart depicting a method 2400 for count series forecasting, in accordance with at least one embodiment. The method 2400 may begin at block 2402 where a time series data set may be received. In at least one example, the time series data set may include a plurality of data points that correspond to a plurality of discrete values (e.g., a count series data set). For example, the time series analysis engine 2316 of FIG. 23 may receive a time series data set from the time series data store 2330 of FIG. 23. In at least one example, the graphical interface of FIG. 20, described below, may be utilized by a user to provide user input (e.g., a user specification).

The method 2400 may, in some examples, be utilized to predict future data points related to any suitable count series data set. Exemplary count series data sets may include, but are not limited to, counts related to a items in inventory (e.g., a number related to a particular item in a grocery store), occurrences of disease in a population (e.g., a number of AIDS patients in a particular zip code), a number of sales during a particular time period (e.g., a number of shoes of a particular type sold in March of 1981), a count of Medal of Honor recipients from a particular state (e.g., Medal of Honor recipients from Texas), and the like. It should be understood that a count series data set may correspond to any number of situations in which the data set analyzed are made up of discrete values.

At block 2404, a set of counts may be generated (e.g., by the time series analysis engine 2316 of FIG. 23). In at least one example, the set of counts may be generated by analyzing the time series data set. The set of counts, in some cases, may correspond to a number of instances of a particular discrete value occurs in the time series data set. In at least one example, the time series analysis engine 2316 may produce a set of counts corresponding to count series data set 1200 of FIG. 12.

At block 2406, an optimal discrete probability distribution for the set of counts may be selected from a set of candidate discrete probability distributions. In at least one example, the user interface 2100 of FIG. 21 may be utilized to identify the set of candidate discrete probability distributions. In at least one example, the count series forecasting engine 122 may automatically select an optimal discrete probability distribution using a selection criterion (e.g., the selection criterion specified in the user specification). For example, the probability distribution selector engine 2318 of FIG. 23 may fit the set of candidate probability distributions to the set of counts for the time series data set. The fit may then be evaluated (e.g., by the probability distribution selector engine 2318) based on the specified selection criterion. A probability distribution having a best fit, for example, may be selected by the probability distribution selector engine 2318. In other examples, the user may select a candidate discrete probability distribution to be used.

Continuing with the example of FIG. 24, FIG. 25 illustrates an example chart 2500 of selected distribution parameter estimates, in accordance with at least one embodiment. For example, the user specification may identify a number of probability distributions to be considered (e.g., a zero-modified binomial probability distribution, a zero-modified geometric probability distribution, and a zero-modified Poisson probability distribution) as depicted at 2502. The user specification may further specify a selection criterion. The values at 2504 correspond to selection values for the set of probability distributions corresponding to a zero-value log-likelihood selection criterion. The values at 2506 correspond to selection values for the set of probability distributions corresponding to a log-likelihood selection criterion. The values at 2508 correspond to selection values for the set of probability distributions corresponding to an AIC selection criterion. The values at 2510 correspond to selection values for the set of probability distributions corresponding to a BIC selection criterion. A lowest value for the selection criterion may be selected as the optimal probability distribution by the probability distribution selector engine 2318. For example, considering that the user specification indicates that an AIC selection criterion is to be used, the zero-modified Poisson distribution may be selected for the optimal probability distribution at 2512, given that the corresponding AIC value for the zero-modified Poisson distribution has the lowest computed AIC value. Although a lowest value for the selection criterion is used in this example, it should be appreciated that in some examples, the distribution with the highest value may be selected, depending on the selection criterion used.

In one non-limiting example, a procedure (e.g., a COUNT statement used in SAS/ETS developed by SAS Institute, Inc. of Cary, N.C.) may be used to analyze a time series data set (e.g., the CountSeries data set). The time series data set may include monthly time series data (e.g., discrete values corresponding to item inventory) from an inventory system. In at least one example, the following statement may be used to perform analysis on the time series data set:

```
proc timeseries data=CountSeries out=_NULL_ print=counts
countplot=all;
    count / distribution=(zmbinomial zmgeometric zmpoisson)
    criterion=aic alpha=0.05;
    id Date interval=month;
    var Units;
run;
```

Where "data=CountSeries" identifies the name of the data set to be analyzed. The "print=counts" and "countplot=all" options indicate that the count series analysis is to be performed. The "distribution" option specifies a list of candidate distributions (e.g., zero-modified binomial, zero-modified geometric, and zero-modified Poisson). The "criterion" option specifies AIC as the selection criterion. The "alpha" option specifies the significance level of 0.05, that in turn, causes the confidence level to be set to 0.95 (95%) given that a significance level+the confidence level equals 1.0.

Continuing on with the example of FIG. 24, at block 2408, a set of parameters corresponding to the optimal discrete probability distribution may be generated (e.g., by the probability distribution selector engine 2318 of FIG. 23). Continuing with the example from block 2406, a set of parameters may be generated for a zero-modified Poisson distribution of the data set. For example, FIG. 26A illustrates an example of a table 2600A that includes a set of parameters generated for an optimal discrete probability distribution. The parameter $p_0^M$ of the table 2600A corresponds to the zero-modified (percentage), and the parameter lambda corresponds to a Poisson distribution parameter. In this example, 29% of the data set is zero, giving a zero-modification parameter of 0.29.

Using the set of parameters of FIG. 26A a set of distribution estimates may be generated. FIG. 26B illustrates and example table 2600B includes a set of distribution estimates for a discrete probability distribution, in accordance with at least one embodiment. For example, the mean of the zero-modified Poisson distribution equals 3.47. The variance equals 8.25522. The standard error equals 2.87319. The 95% discrete confidence limits may be determined to include values between 0 and 8. It should be appreciated that the confidence limits are nonnegative and integer-valued.

Continuing on with the example of FIG. 24, at block 2410, a statistical model for the time series data set may be selected (e.g., by the forecast generator 2320 of FIG. 23). Selecting the statistical model may include using a set of statistical models and the selection criterion. For example, FIG. 26C illustrates an example of a table 2600C indicating a statistical fit of a number of exponential smoothing models to a data set, in accordance with at least one embodiment. For example, a seasonal exponential smoothing model, a Winters method (additive) model, and a Winters method (multiplicative) model may each be used to produce a forecast. Each forecast may be analyzed and a corresponding statistical fit value may be determined. An optimal statistical model may be selected based on the statistical fit value and a selection criterion.

For example, given the user has specified an AIC selection criterion, each forecast generated from the indicated statistical models (e.g., automatically by the forecast generator 2320 of FIG. 23) may be scored based on the AIC selection criterion. In the example depicted by table 2600C, the seasonal exponential smoothing model may be selected as an optimal statistical model given a lowest AIC score. Although a lowest value for the selection criterion is used in this example, it should be appreciated that in some examples, a highest value may be selected, depending on the selection criterion used.

In one non-limiting example, a procedure (e.g., the HPF (High-Performance Forecasting) procedure of SAS Forecast Server) may be used (e.g., by the forecast generator 2320 of FIG. 23) to perform forecasting for a data set (e.g., the CountSeries data set). The data set may include monthly time series data (e.g., discrete values corresponding to item inventory) from an inventory system. In at least one example, the following statement may be used to perform automatic time series forecasting using a number of exponential smoothing statistical models:

```
proc hpf data=CountSeries out=_NULL_ outfor=forecasts
(rename=(actual=Units))
    plot=modelforecasts lead=24 back=24;
    id date interval=month;
    forecast units / model=bests alpha=0.05 select=aic;
run;
```

The "lead=24" and "back=24" options in the PROC HPF statement specify the size of the forecast region and the out-of-sample region, respectively. The FORECAST statement specifies the desired automation. The "model=bests" option specifies that seasonal models be considered. The "select=aic" option specifies the selection criterion for the time series models (e.g., an AIC selection criterion). In this example, the statistical models are evaluated based on the fit region. The "alpha=0.05" option specifies the confidence level of 0.95 (or "95%").

Continuing on with the example of FIG. 24, at block 2412, the set of predicted future data points for the time series data set may be generated. In at least one example, generating the set of predicted future data points may include using the selected statistical model from block 2410.

At block 2414, the set of predicted future data points for the time series data set may be adjusted (e.g., by the time series analysis engine 2316 of FIG. 23). In at least one example, adjusting the set of predicted future data points includes using the set of parameters corresponding to the optimal discrete probability distribution from block 2408 (e.g., the set of parameters generated by the probability distribution selector engine 2318 of FIG. 23).

In one non-limiting example, a procedure (e.g., the TIME-DATA procedure of SAS/ETS) may be used (e.g., by the forecast generator 2320 of FIG. 23) to perform forecasting for a data set (e.g., the CountSeries data set). The time series data set may include monthly time series data (e.g., discrete values corresponding to item inventory) from an inventory system. In at least one example, the following statement may be used to perform automatic time series forecasting using a number of exponential smoothing statistical models:

```
proc timedata data=forecasts(drop=lower upper) out=_NULL_
    outarray=adjusted(drop=predict);
    var units predict std error;
    id date interval=month;
    outarray lower upper ppred;
    do t=1 to _LENGTH_;
        ppred[t] = max(predict[t],0.0001);
        lower[t] = quantile('POISSON',1 – 0.5/2, ppred[t]);
        upper[t] = quantile('POISSON', 0.5/2, ppred[t]);
    end;
run;
```

In a non-limiting example, the example graph 1900 of FIG. 19 may be generated by the output of the procedure disclosed above.

At block 2416 of FIG. 24, a predicted data point may be provided (e.g., by the time series analysis engine 2316 of FIG. 23) using the adjusted set of predicted future data points. In at least one example, the predicted data point may be based on received user input associated with the data set.

Figure 27:
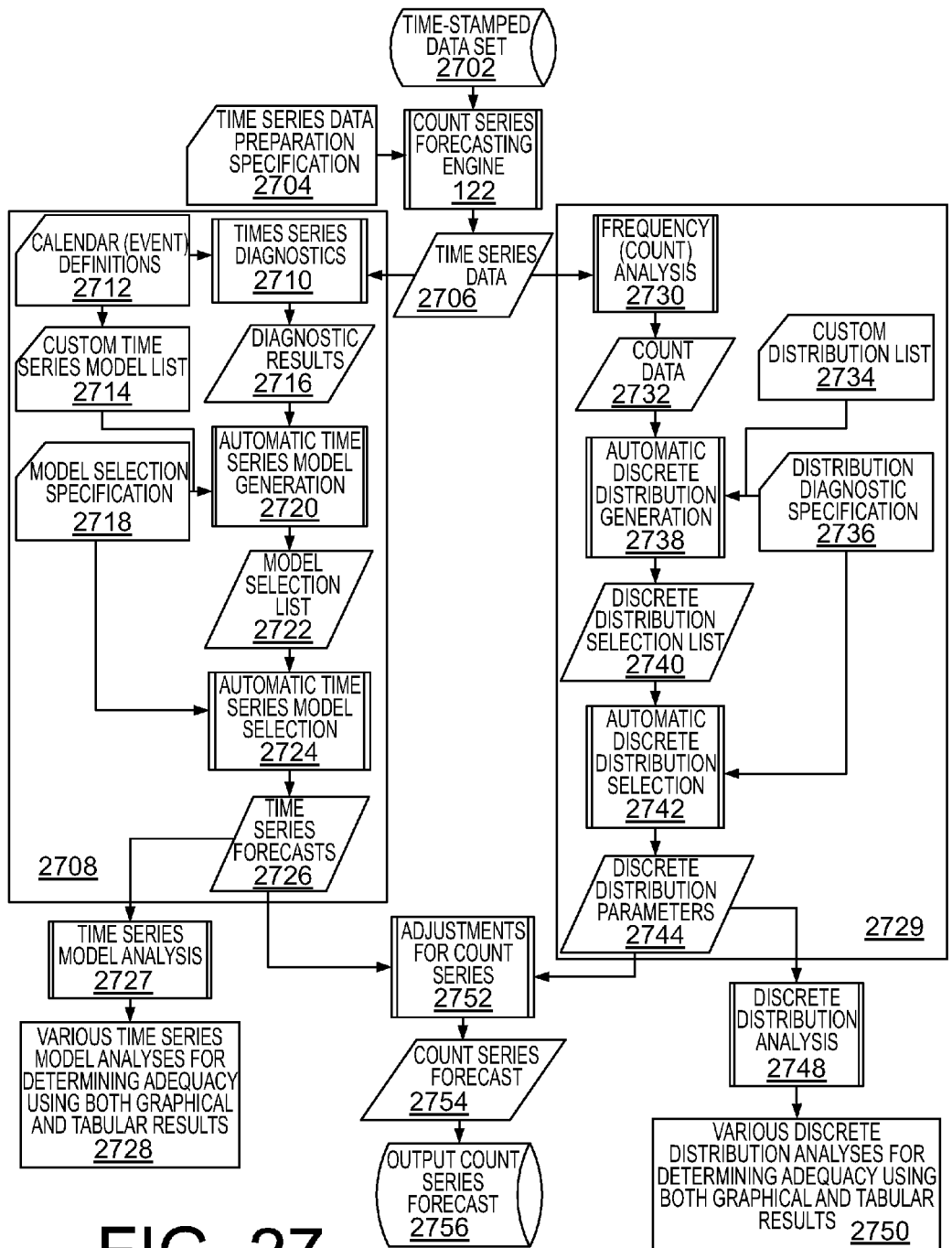
FIG. 27 is a diagram depicting a method for count series forecasting in accordance with at least one embodiment.

FIG. 27 is a diagram depicting a method 2700 for count series forecasting in accordance with at least one embodiment. The method 2700 may begin at block 2702, where a time-stamped data set may be received (e.g., by count series forecasting engine 122, for example). The time-stamped data set may be received from a data store responsible for storing such information (e.g., the time series data store 2330 of FIG. 23). In some examples, the time-stamped data set may be identified by a user utilizing a graphical user interface (e.g., the graphical user interface 2314 of FIG. 23) provided by the count series forecasting engine 122. A time series data preparation specification 2704 may be obtained or received by the count series forecasting engine 122 (e.g., by the time series analysis engine 2316 of FIG. 23). For example, the time series data preparation specification 2704 may be user-specified and may include, for example, a target variable, a response (e.g., a dependent variable, and one or more predictor variables (e.g., independent variables). In at least one example, a user may define the time series data preparation specification 2704 using a graphical user interface (e.g., the graphical user interface 2314 of FIG. 23) provided by the count series forecasting engine 122, or in other examples, the user may utilize a predefined time series data preparation specification. In at least one example, the time series data 2706 includes the identification of the time-stamped data set received at 2702 and the time series data preparation specification 2704. In some examples, the time-stamped data set received at 2702 includes the identification of the time-stamped data set received at 2702.

In at least one embodiment, a time series forecasting process 2708 for providing time series forecasts may begin at block 2710. The user may provide, for example, via a graphical user interface (e.g., the graphical user interface 2314) provided by the count series forecasting engine 122, calendar event definitions 2712 (e.g., defining events related to the time series data 2706) and a custom time series model list 2714 (e.g., a list specifying a number of time series models). The calendar event definitions 2712 may be utilized (e.g., by the time series analysis engine 2316 of FIG. 23) to generate diagnostic results 2716. The diagnostic results 2716 may be generated by performing various analyses on the time series data 2706, for example, analyses that relate to intermittency, trend, seasonality, and/or autocorrelation, to name a few. A model selection specification 2718 may be specified by the user utilizing a graphical interface (e.g., the graphical user interface 2314) provided by the count series forecasting engine 122. In other embodiments, the model selection specification 2718 may be generated (e.g., by the time series analysis engine 2316 of FIG. 23) from the diagnostic results 2716. In at least one example, the model selection specification 2718 specifies a list of candidate models and describes how to select from among the models.

In at least one embodiment, one or more time series models may be automatically generated at 2720 (e.g., by the forecast generator 2320 of FIG. 23), for example, utilizing the model selection specification 2718 to produce a model selection list 2722. Subsequent to generating the model selection list 2722, a process for automatic time series model selection may be performed at 2724 (e.g., by the forecast generator 2320 of FIG. 23) utilizing, for example, the model selection specification 2718. One or more time series forecasts 2726 may be generated (e.g., by the forecast generator 2320 of FIG. 23) using the selected model from 2724.

Subsequent to performing the time series forecasting process 2708, a time series model analysis process 2727 may be performed by, for example, the forecast generator 2320, in order to determine a degree of accuracy related to the one or more time series forecasts 2726 generated using the selected model from 2724. The time series model analysis process 2727 may produce various time series model analyses (e.g., in one or both graphical, and/or tabular form) to the user at 2728 (e.g., utilizing the display manager 2322 of FIG. 23). In some cases, the user may determine that the degree of accuracy is unacceptable and the time series forecasting process 2708 may be repeated (e.g., at the user's request) in order to determine a more accurate times series model with which to generate forecasts.

At a same, or different, time as the time series forecasting process 2708 is being performed, a frequency count analysis process 2729 may begin at 2730 where count data 2732 (e.g., a set of counts corresponding to a number of occurrences of a particular value in the time series data 2706) may be determined from time series data 2706 (e.g., by the probability distribution selector engine 2318 of FIG. 23). In some examples, the user may specify a custom distribution list 2734 (e.g., utilizing graphical user interface 2314 of FIG. 23). In other examples, a predefined custom distribution list may be utilized. The custom distribution list 2734 may include a list of candidate probability distributions to be utilized when performing the frequency count analysis process 2729. A distribution diagnostic specification 2736 may be obtained or received by the count series forecasting engine 122 (e.g., by the probability distribution selector engine 2318 of FIG. 23).

For example, the distribution diagnostic specification 2736 may include the custom distribution list 2734 as well as a list of one or more distribution selection criterion.

In at least one embodiment, one or more discrete distributions may be generated at 2738 (e.g., by the probability distribution selector engine 2318 of FIG. 23), for example, utilizing the distribution diagnostic specification 2736 to produce a discrete distribution selection list 2740. Subsequent to generating the discrete distribution selection list 2740, a process for automatic discrete distribution selection may be performed at 2742 (e.g., by the probability distribution selector engine 2318 of FIG. 23) utilizing, for example, the distribution diagnostic specification 2736. One or more discrete distribution parameters 2744 may be generated (e.g., by the probability distribution selector engine 2318 of FIG. 23) using the discrete distribution selected at 2742.

Subsequent to performing the frequency count analysis process 2729, a discrete distribution analysis 2746 may be performed by, for example, the probability distribution selector engine 2318 of FIG. 23, in order to determine a degree of adequacy related to the discrete distribution parameters generated at 2744 using the discrete distribution selected at 2742. The frequency count analysis process 2729 may produce various discrete distribution analyses (e.g., in one or both graphical, and/or tabular form) to the user at 2750 (e.g., utilizing the display manager 2322 of FIG. 23). In some cases, the user may determine that the degree of adequacy is unacceptable and the frequency count analysis process 2729 may be repeated (e.g., at the user's request) in order to determine a more accurate discrete distribution with which to generate discrete distribution parameters.

In at least one embodiment, once a sufficiently accurate forecast and adequate discrete distribution parameter(s) have been generated via the time series forecasting process 2708 and the frequency count analysis process 2729, respectively, adjustments may be made to the generated time series at 2752 to produce a count series forecast 2754. An example adjusted count series forecast is depicted above with respect to FIG. 19.

In at least one embodiment, the count series forecast may be outputted at 2756. For example, the count series forecast may be provided to a user (e.g., by the display manager 2322 of FIG. 23). Additionally, or alternatively, the count series forecast may be stored for later use (e.g., in forecast data store 2360 of FIG. 23).

While this disclosure may contain many specifics, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be utilized. Moreover, the separation of various system components in the implementations described above should not be understood as requiring such separation in all implementations, and it should be understood that the described program components and systems can generally be integrated together in a single software or hardware product or packaged into multiple software or hardware products.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server in order to deliver statistical modeling and machine learning capabilities in a highly interactive programming environment, which may enable multiple users to concurrently manage data, transform variables, perform exploratory analysis, build and compare models and score. Some systems may use SAS In-Memory Statistics for Hadoop® to read big data once and analyze it several times by persisting it in-memory for the entire session.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situations where only the disjunctive meaning may apply.

What is claimed is:

1. A system for adjusting a set of predicted future data points for a time series data set, comprising:
  a processor and;
  a non-transitory computer readable storage medium containing instructions that, when executed with the processor, cause the processor to perform operations including:
    receiving the time series data set, wherein the time series data set includes a plurality of data points that correspond to a plurality of discrete values;
    generating a set of counts for the time series data set by analyzing the time series data, wherein a count corresponds to a number of instances of a particular discrete value in the time series data set;
    automatically selecting an optimal discrete probability distribution for the set of counts from a set of candidate discrete probability distributions based on a selection criterion;
    generating a set of parameters corresponding to the optimal discrete probability distribution;
    selecting a statistical model for the time series data set, wherein selecting the statistical model includes using a set of statistical models and the selection criterion;
    generating the set of predicted future data points for the time series data set, wherein generating the set of predicted future data points includes using the selected statistical model;
    adjusting the set of predicted future data points for the time series data set, wherein adjusting the set of predicted future data points includes using the set of parameters corresponding to the optimal discrete probability distribution; and using the adjusted set of predicted future data points to provide a predicted future data point based on received user input associated with the time series data set.

2. The system of claim 1, wherein a discrete probability distribution outputs a corresponding non-negative value for each value in a range of the discrete probability distribution.

3. The system of claim 1, wherein the statistical model is configured to utilize the plurality of data points as continuous variables.

4. The system of claim 1, wherein the plurality of data points correspond to a plurality of distinct values.

5. The system of claim 1, wherein the time series data set includes over a threshold number of data points that correspond to a zero value.

6. The system of claim 1, wherein the set of candidate discrete probability distributions includes at least one of a binomial probability distribution, a zero-modified negative binomial distribution, a zero-modified binomial probability distribution, a geometric probability distribution, a zero-modified geometric probability distribution, a Poisson probability distribution, a zero-modified Poisson probability distribution, a log series distribution, or a negative binomial probability distribution.

7. The system of claim 1, wherein the set of statistical models includes at least one time series model comprising an exponential smoothing model.

8. The system of claim 1, wherein the operations further include receiving the set of discrete probability distributions and the selection criterion from a user.

9. The system of claim 1, wherein the set of parameters includes at least one of a standard error, an upper limit corresponding to a confidence range, and a lower limit correspond to the confidence range.

10. The system of claim 1, wherein selecting the statistical model for the time series data set further comprises:
receiving indication of a selection criterion;
generating a set of predicted future data points for the time series data set using a plurality of statistical models; and
generating, by the one or more processors, a plurality of error measurements corresponding to each of the plurality of statistical models.

11. The system of claim 10, wherein selecting the statistical model for the time series using the plurality of error measurements includes selecting an optimal error measurement of the plurality of error measurements, wherein the selected statistical model corresponds to the optimal error measurement.

12. The system of claim 10, wherein automatically selecting the optimal discrete probability distribution for the set of counts further comprises:
receiving, by the one or more processors, indication of user-selection of a selection criterion;
generating, by the one or more processors, the set of candidate discrete probability distributions for the set of counts using a set of discrete probability distribution algorithms; and
generating a plurality of error measurements corresponding to each of the set of candidate discrete probability distributions.

13. The system of claim 12, wherein the received selection criterion includes one of an Akaike information criterion, a weighted least-squares criterion, a log-likelihood criterion, or a Bayesian information criterion.

14. The system of claim 12, wherein determining the optimal discrete probability distribution for the set of counts using the plurality of error measurements includes selecting an optimal error measurement of the plurality of error measurements, wherein the optimal discrete probability distribution corresponds to the optimal error measurement.

15. A computer program product, tangibly embodied in a non-transitory machine-readable storage medium, including instructions operable to cause a data processing apparatus to:
receive a time series data set, wherein the time series data set includes a plurality of data points that correspond to a plurality of discrete values;
generate a set of counts for the time series data set by analyzing the time series data, wherein a count corresponds to a number of instances of a particular discrete value in the time series data set;
automatically select an optimal discrete probability distribution for the set of counts from a set of discrete probability distributions based on a selection criterion;
generate a set of parameters corresponding to the optimal discrete probability distribution;
select a statistical model for the time series data set, wherein selecting the statistical model includes using a set of statistical models and the selection criterion;
generate a set of predicted future data points for the time series data set, wherein generating the set of predicted future data points includes using the selected statistical model;
adjust the set of predicted future data points for the time series data set, wherein adjusting the set of predicted future data points includes using the set of parameters corresponding to the optimal discrete probability distribution; and
use the adjusted set of predicted future data points to provide a predicted future data point based on received user input associated with the time series data set.

16. The computer program product of claim 15, wherein a discrete probability distribution outputs a corresponding non-negative value for each value in the range of the discrete probability distribution.

17. The computer program product of claim 15, wherein the statistical model is configured to utilize the plurality of data points as continuous variables.

18. The computer program product of claim 15, wherein the plurality of data points correspond to a plurality of distinct values.

19. The computer program product of claim 15, wherein the time series data set includes over a threshold number of data points that correspond to a zero value.

20. A computer-implemented method for adjusting a set of predicted future data points for a time series data set, comprising:
receiving, by one or more processors, a time series data set, wherein the time series data set includes a plurality of data points that correspond to a plurality of discrete values;
generating, by the one or more processors, a set of counts for the time series data set by analyzing the time series data, wherein a count corresponds to a number of instances of a particular discrete value in the time series data set;
automatically selecting, by the one or more processors, an optimal discrete probability distribution for the set of counts from a set of discrete probability distributions based on a selection criterion;

generating, by the one or more processors, a set of parameters corresponding to the optimal discrete probability distribution;

selecting, by the one or more processors, a statistical model for the time series data set, wherein selecting the statistical model includes using a set of statistical models and the selection criterion;

generating, by the one or more processors, the set of predicted future data points for the time series data set, wherein generating the set of predicted future data points includes using the selected statistical model;

adjusting, by the one or more processors, the set of predicted future data points for the time series data set, wherein adjusting the set of predicted future data points includes using the set of parameters corresponding to the optimal discrete probability distribution; and using, by the one or more processors, the adjusted set of predicted future data points to provide a predicted future data point based on received user input associated with the data set.

21. The method of claim 20, wherein a discrete probability distribution outputs a corresponding non-negative value for each value in a range of the discrete probability distribution.

22. The method of claim 20, wherein the statistical model is configured to utilize the plurality of data points as continuous variables.

23. The method of claim 20, wherein the plurality of data points correspond to a plurality of distinct values.

24. The method of claim 20, wherein the time series data set includes over a threshold number of data points that correspond to a zero value.

25. The method of claim 20, wherein the set of candidate discrete probability distributions includes at least one of a binomial probability distribution, a zero-modified negative binomial distribution, a zero-modified binomial probability distribution, a geometric probability distribution, a zero-modified geometric probability distribution, a Poisson probability distribution, a zero-modified Poisson probability distribution, a log series distribution, or a negative binomial probability distribution.

26. The method of claim 20, wherein the set of statistical models includes at least one time series model comprising an exponential smoothing model.

27. The method of claim 20, further comprising receiving the set of discrete probability distributions and the selection criterion from a user.

28. The method of claim 20, wherein the set of parameters includes at least one of a standard error, an upper limit corresponding to a confidence range, and a lower limit correspond to the confidence range.

29. The method of claim 20, wherein selecting the statistical model for the time series data set further comprises:
receiving indication of a selection criterion;
generating a set of predicted future data points for the time series data set using a plurality of statistical models; and
generating, by the one or more processors, a plurality of error measurements corresponding to each of the plurality of statistical models.

30. The method of claim 29, wherein selecting the statistical model for the time series using the plurality of error measurements includes selecting an optimal error measurement of the plurality of error measurements, wherein the selected statistical model corresponds to the optimal error measurement.

31. The method of claim 29, wherein automatically selecting the optimal discrete probability distribution for the set of counts further comprises:

receiving, by the one or more processors, indication of user-selection of a selection criterion;

generating, by the one or more processors, the set of candidate discrete probability distributions for the set of counts using a set of discrete probability distribution algorithms; and generating a plurality of error measurements corresponding to each of the set of candidate discrete probability distributions.

32. The method of claim 31, wherein the received selection criterion includes one of an Akaike information criterion, a weighted least-squares criterion, a log-likelihood criterion, or a Bayesian information criterion.

33. The method of claim 31, wherein determining the optimal discrete probability distribution for the set of counts using the plurality of error measurements includes selecting an optimal error measurement of the plurality of error measurements, wherein the optimal discrete probability distribution corresponds to the optimal error measurement.

34. The computer program product of claim 15, wherein the set of candidate discrete probability distributions includes at least one of a binomial probability distribution, a zero-modified negative binomial distribution, a zero-modified binomial probability distribution, a geometric probability distribution, a zero-modified geometric probability distribution, a Poisson probability distribution, a zero-modified Poisson probability distribution, a log series distribution, or a negative binomial probability distribution.

35. The computer program product of claim 15, wherein the set of statistical models includes at least one time series model comprising an exponential smoothing model.

36. The computer program product of claim 15, wherein the instructions are further operable to cause the data processing apparatus to receive the set of discrete probability distributions and the selection criterion from a user.

37. The computer program product of claim 15, wherein the set of parameters includes at least one of a standard error, an upper limit corresponding to a confidence range, and a lower limit correspond to the confidence range.

38. The computer program product of claim 15, wherein selecting the statistical model for the time series data set further comprises:
receiving indication of a selection criterion;
generating a set of predicted future data points for the time series data set using a plurality of statistical models; and
generating, by the one or more processors, a plurality of error measurements corresponding to each of the plurality of statistical models.

39. The computer program product of claim 38, wherein selecting the statistical model for the time series using the plurality of error measurements includes selecting an optimal error measurement of the plurality of error measurements, wherein the selected statistical model corresponds to the optimal error measurement.

40. The computer program product of claim 38, wherein automatically selecting the optimal discrete probability distribution for the set of counts further comprises:
receiving, by the one or more processors, indication of user-selection of a selection criterion;
generating, by the one or more processors, the set of candidate discrete probability distributions for the set of counts using a set of discrete probability distribution algorithms; and
generating a plurality of error measurements corresponding to each of the set of candidate discrete probability distributions.

41. The computer program product of claim 40, wherein the received selection criterion includes one of an Akaike information criterion, a weighted least-squares criterion, a log-likelihood criterion, or a Bayesian information criterion.

42. The computer program product of claim 40, wherein determining the optimal discrete probability distribution for the set of counts using the plurality of error measurements includes selecting an optimal error measurement of the plurality of error measurements, wherein the optimal discrete probability distribution corresponds to the optimal error measurement.

* * * * *